United States Patent [19]

Sears, III et al.

[11] Patent Number: 4,751,648
[45] Date of Patent: Jun. 14, 1988

[54] LOCAL AREA NETWORK DATA TRANSFER SYSTEM

[75] Inventors: Leslie R. Sears, III, Duncan; Alan J. Pitts, Comanche; Stephen F. Crain, Duncan; Edward L. Woodall, Duncan; Michael L. Green, Duncan; Don M. Roberts, Duncan; Eugene J. Daunis, Duncan; Mark A. Clark, Duncan, all of Okla.

[73] Assignee: Halliburton Company, Duncan, Okla.

[21] Appl. No.: 847,397

[22] Filed: Mar. 31, 1986

[51] Int. Cl.⁴ .............................................. G06F 15/46
[52] U.S. Cl. ............................... 364/422; 364/900; 364/550
[58] Field of Search ............... 364/556, 557, 558, 505, 364/131, 132, 133, 421, 422, 200, 900; 367/71, 69, 25

[56] References Cited

U.S. PATENT DOCUMENTS

| | | | |
|---|---|---|---|
| 4,212,057 | 7/1980 | Devlin et al. | 364/200 |
| 4,265,266 | 5/1981 | Kierbow et al. | 317/101.19 |
| 4,350,979 | 9/1982 | Eberwein | 340/861 |
| 4,353,482 | 10/1982 | Tomlinson et al. | 222/1 |
| 4,371,929 | 2/1983 | Brann et al. | 364/200 |
| 4,424,559 | 1/1984 | Lorincz | 364/131 |
| 4,430,828 | 2/1984 | Oglevee | 364/505 |
| 4,432,064 | 2/1984 | Barker | 364/132 |
| 4,454,577 | 6/1984 | Costantini et al. | 364/200 |
| 4,473,823 | 9/1984 | Pulverenti et al. | 340/825 |
| 4,497,031 | 1/1985 | Froehling | 364/557 |
| 4,507,735 | 3/1985 | Moorehead | 364/422 |
| 4,509,901 | 4/1985 | McTamaney et al. | 417/18 |
| 4,527,247 | 7/1985 | Kaiser | 364/557 |
| 4,538,221 | 8/1985 | Crain et al. | 364/172 |
| 4,538,222 | 8/1985 | Crain et al. | 364/172 |
| 4,561,057 | 12/1985 | Haley, Jr. et al. | 364/436 |
| 4,571,693 | 2/1986 | Birchak | 364/422 |
| 4,571,993 | 2/1986 | St. Onge | 364/422 |
| 4,593,365 | 6/1986 | Haley, Jr. et al. | 364/510 |
| 4,593,370 | 6/1986 | Balkanli | 364/422 |
| 4,628,436 | 12/1986 | Okamoto et al. | 364/131 |
| 4,636,934 | 1/1987 | Schwendemann et al. | 364/132 |
| 4,639,882 | 1/1987 | Keats | 364/557 |
| 4,661,932 | 4/1987 | Howard | 364/422 |
| 4,672,529 | 6/1987 | Kupersmit | 364/131 |
| 4,672,530 | 6/1987 | Schuss | 364/131 |
| 4,686,625 | 8/1987 | Bryan | 364/422 |
| 4,688,168 | 8/1987 | Gudaitis | 364/134 |

OTHER PUBLICATIONS

C-1314–*Cementing Technical Data*, Halliburton Services, "PDR Data Acquisition Recording System".
Complete Job Monitoring and Recording in a Single Unit, Dowell Schlumberger, PACR Unit.

*Primary Examiner*—Michael R. Fleming
*Attorney, Agent, or Firm*—James R. Duzan; E. Harrison Gilbert, III

[57] ABSTRACT

A data monitoring system includes a display unit for communicating with an operation that has characteristics which are to be monitored, a recording unit located remotely from the environment of the monitored operation, and a local area network interconnect circuit for connecting the display and recording units. The local area network circuit allows multiple display units to be connected to a single pair of electrical conductors. Each display unit has at least one dual microcomputer configuration interconnected by a shared dual port random access memory. A third microcomputer is located in the recording unit for communicating over the local area network circuit with one of the microcomputers in the display unit.

11 Claims, 18 Drawing Sheets

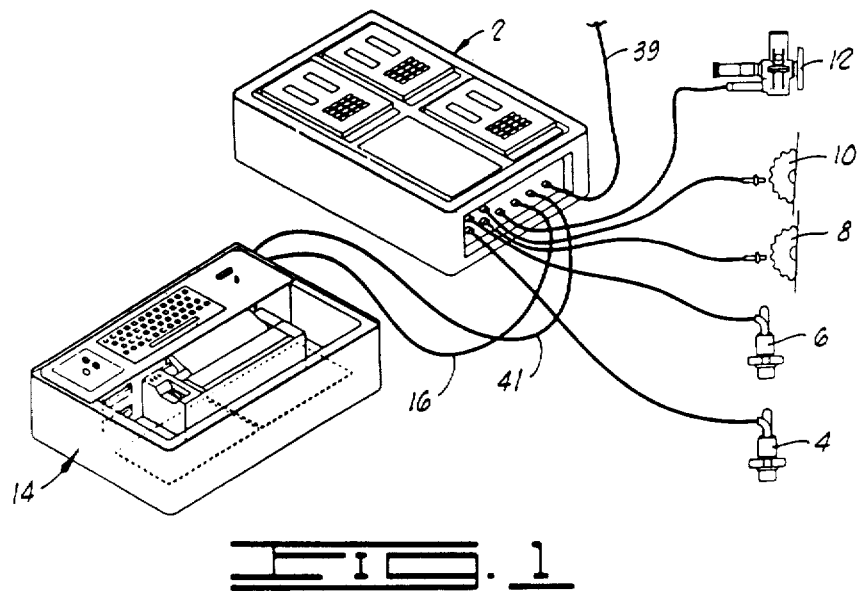
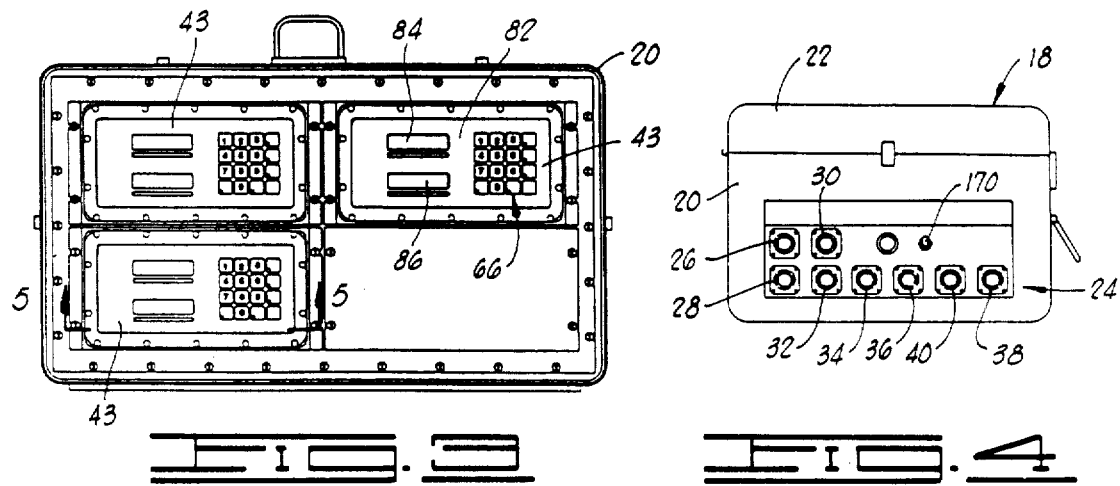
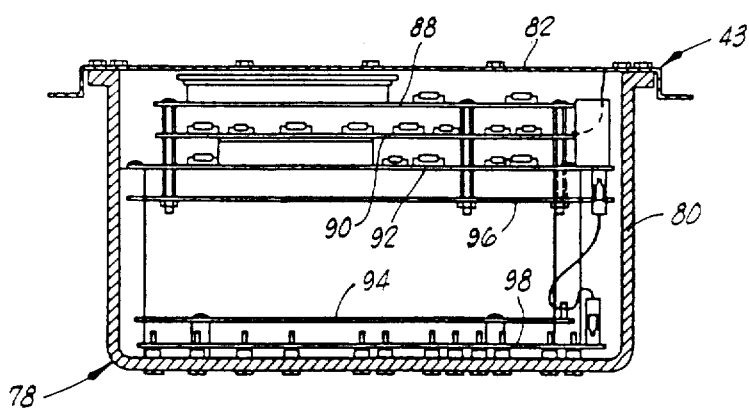

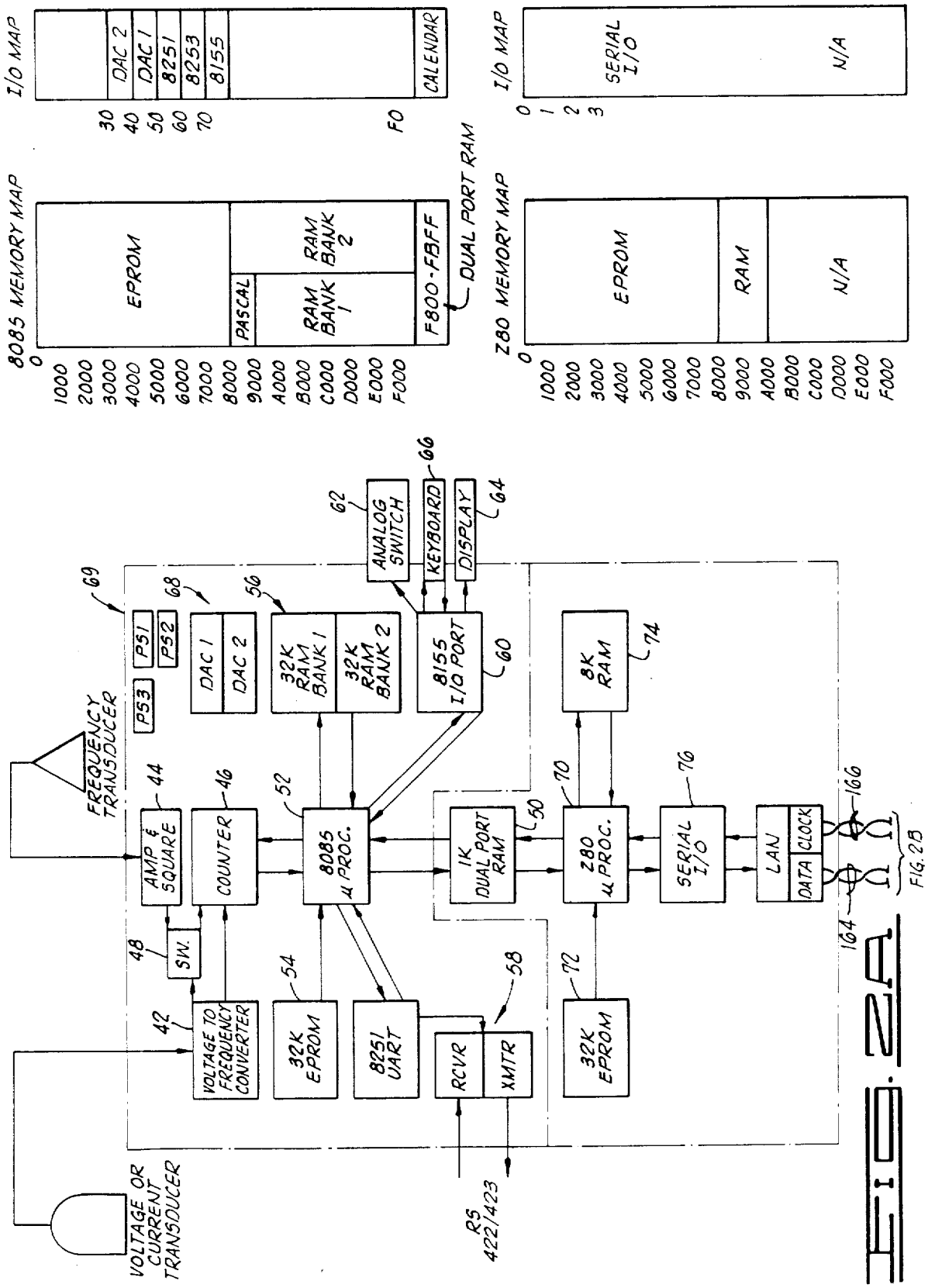

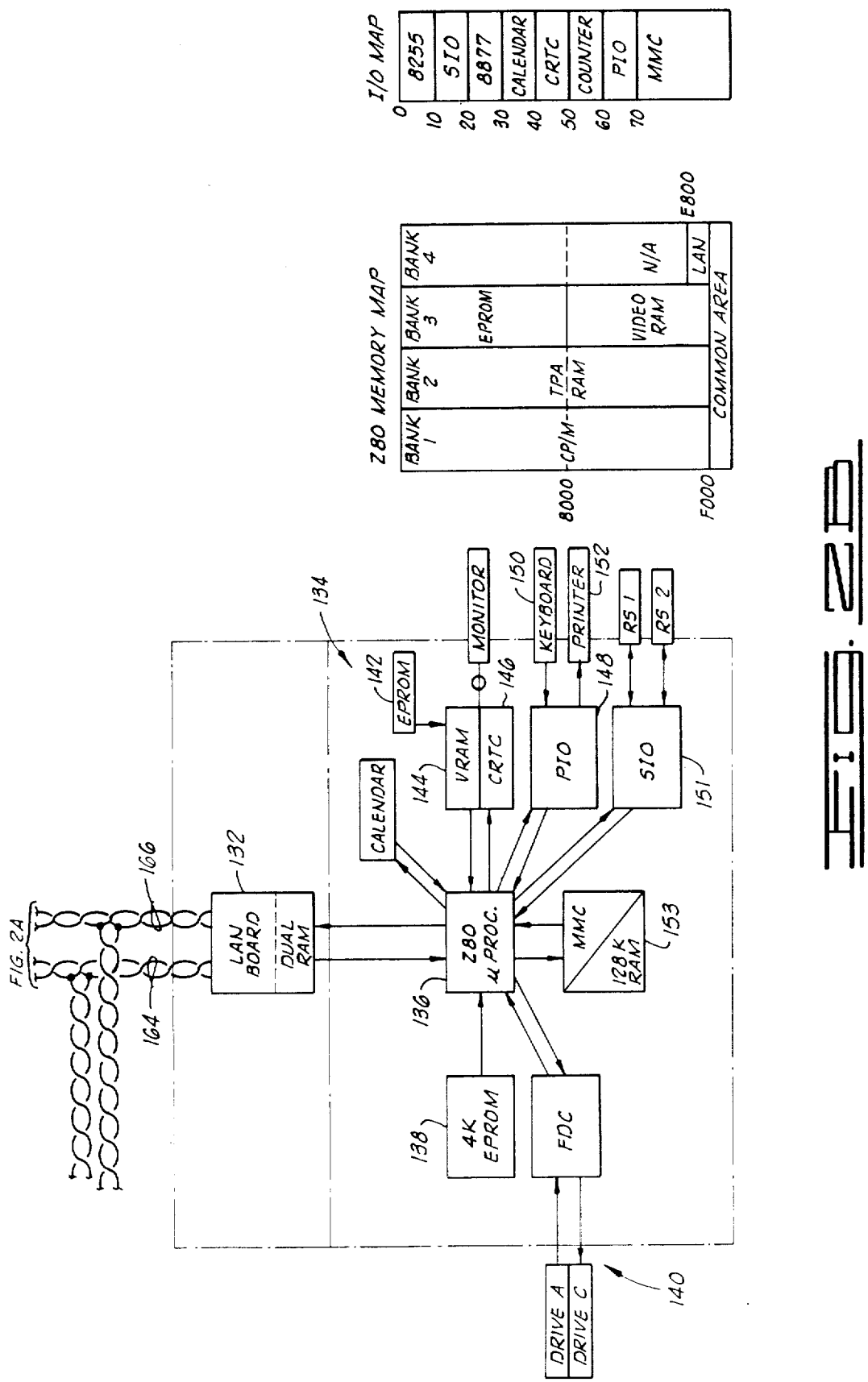

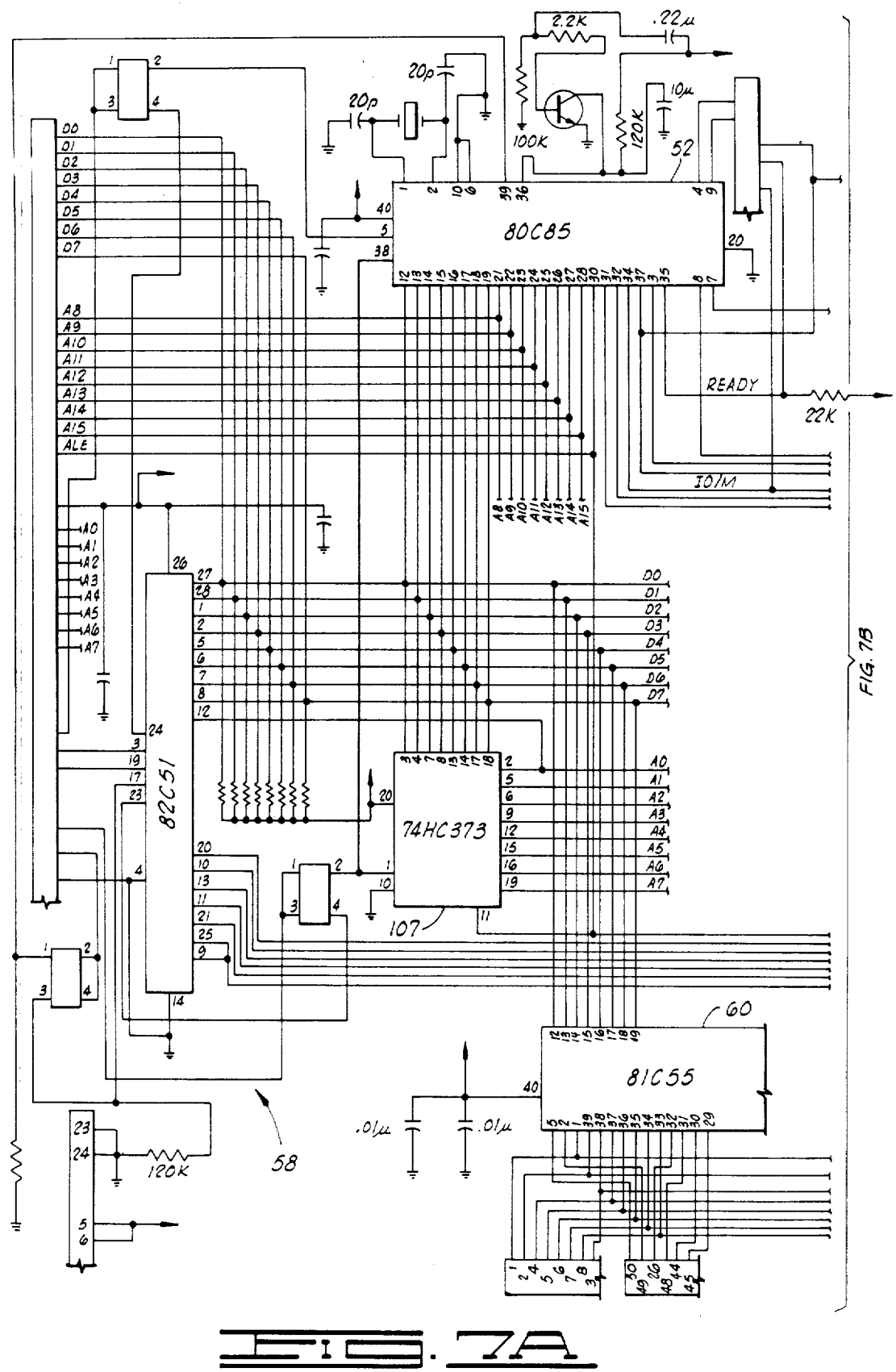

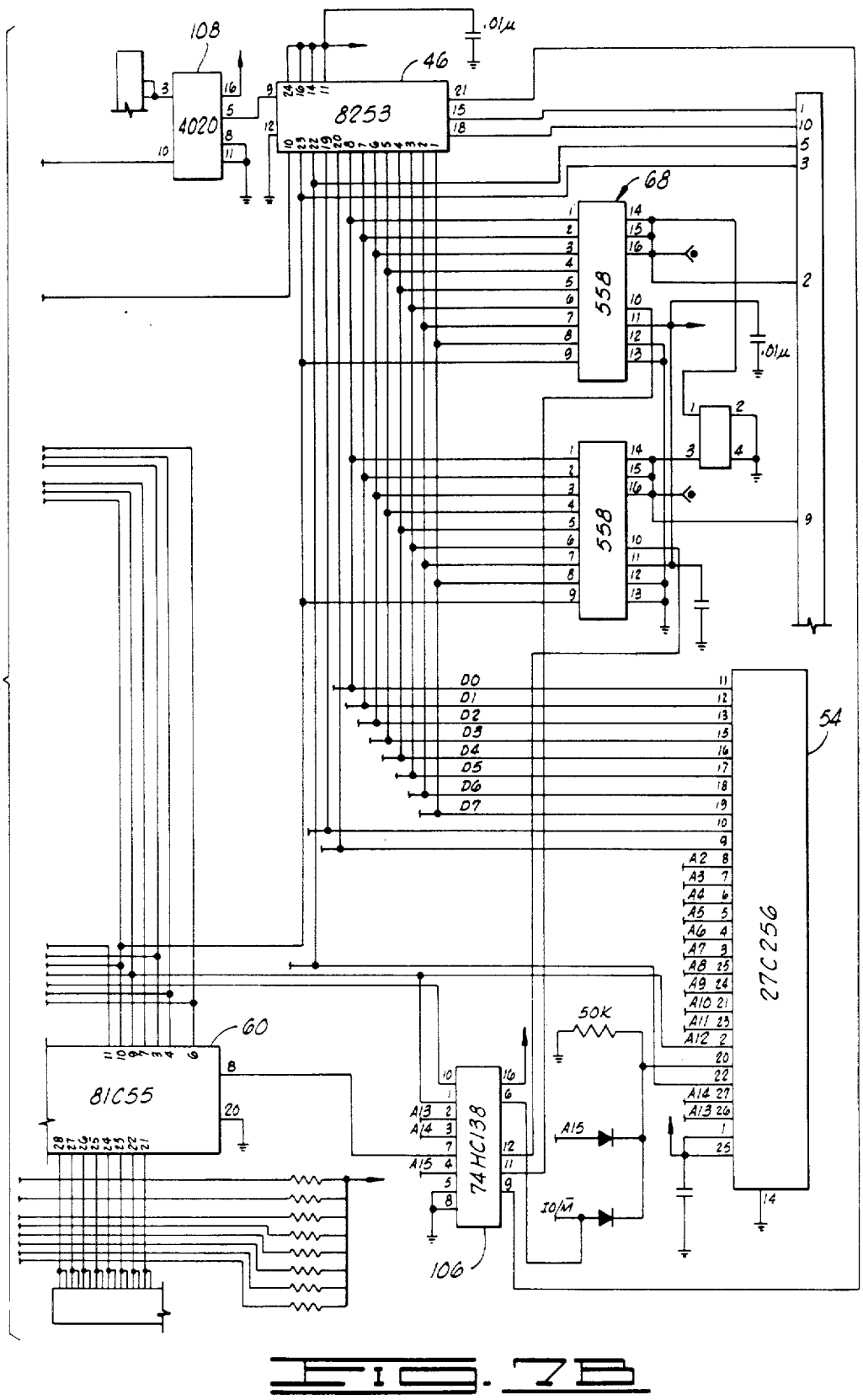

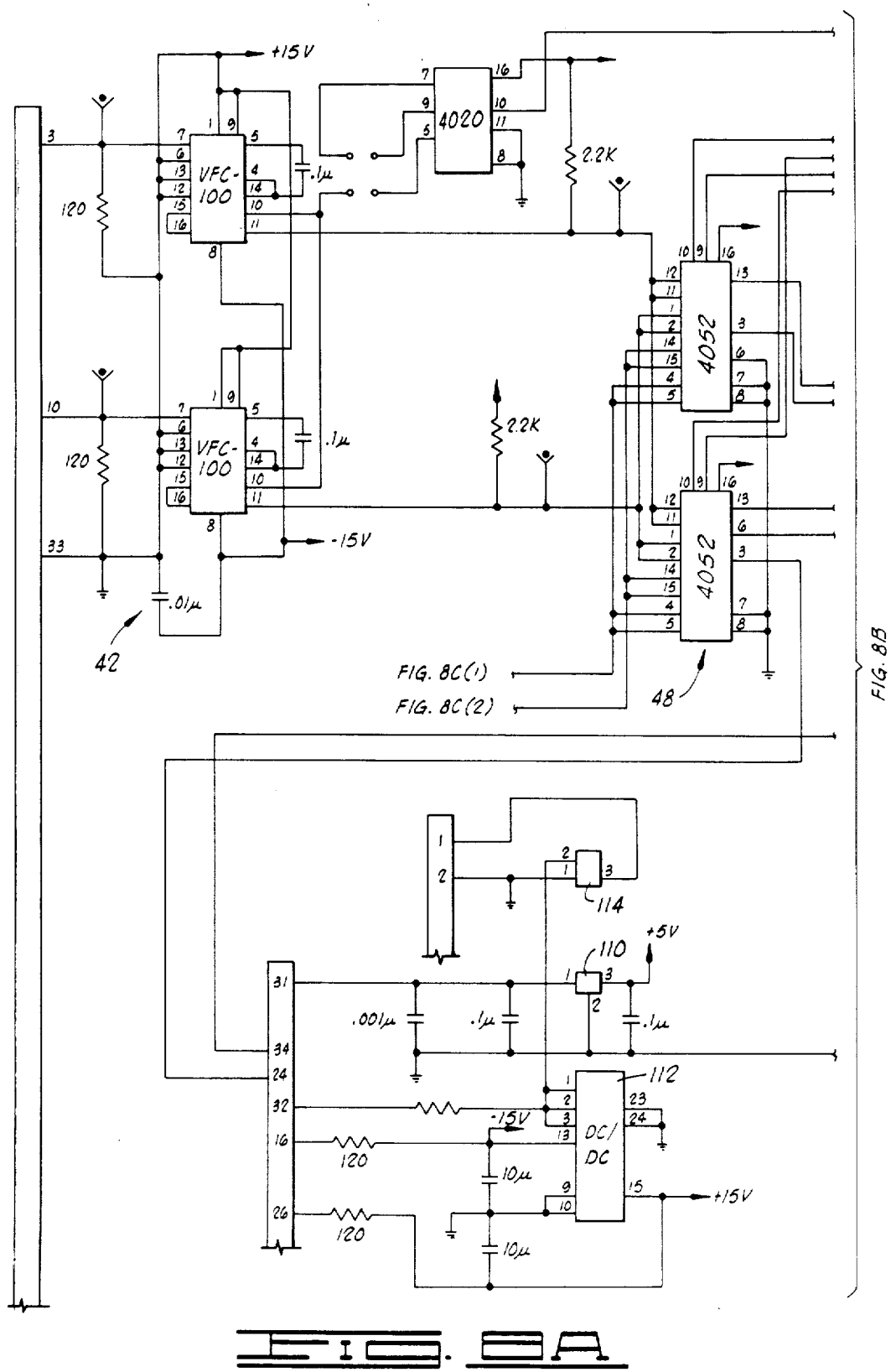

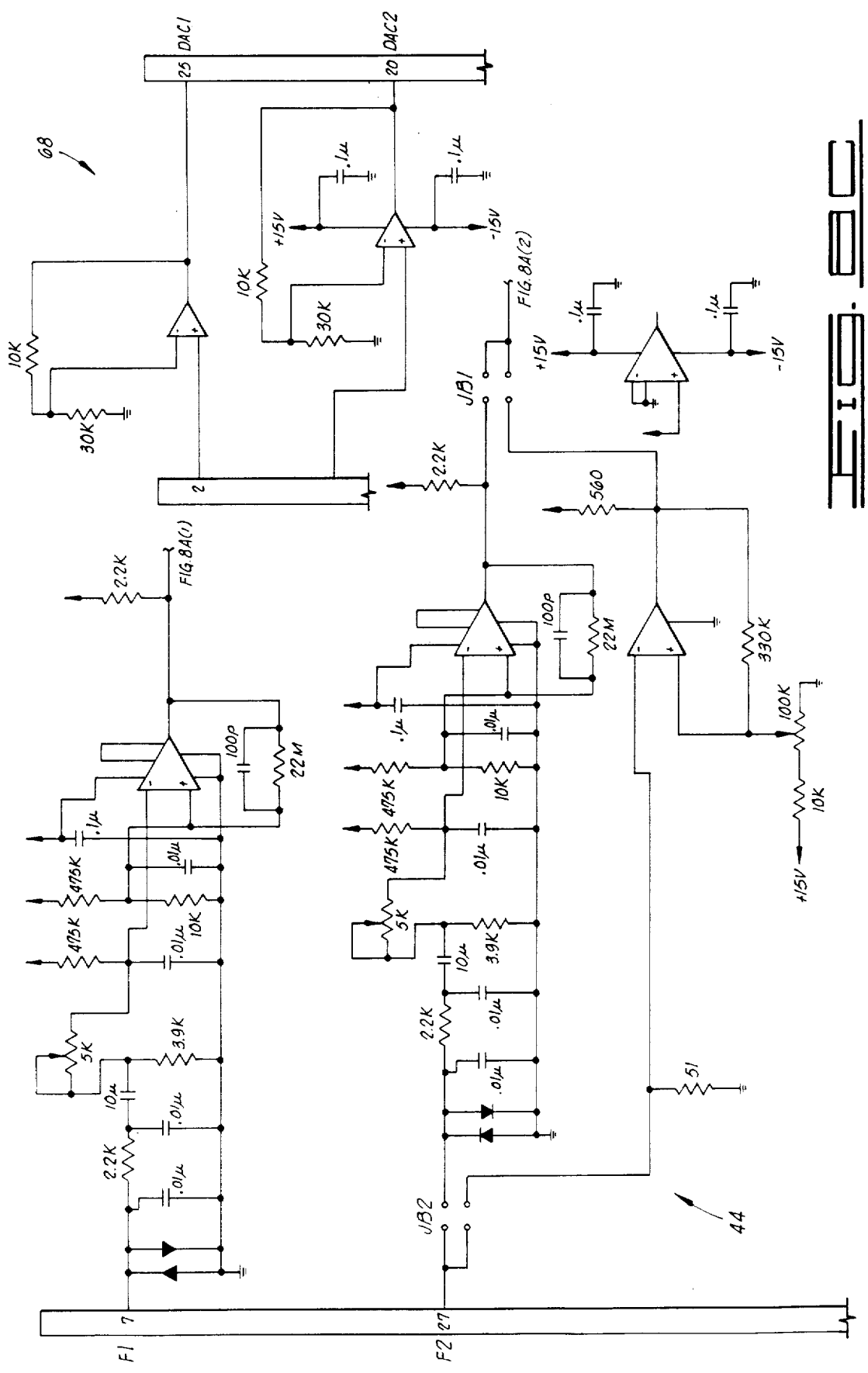

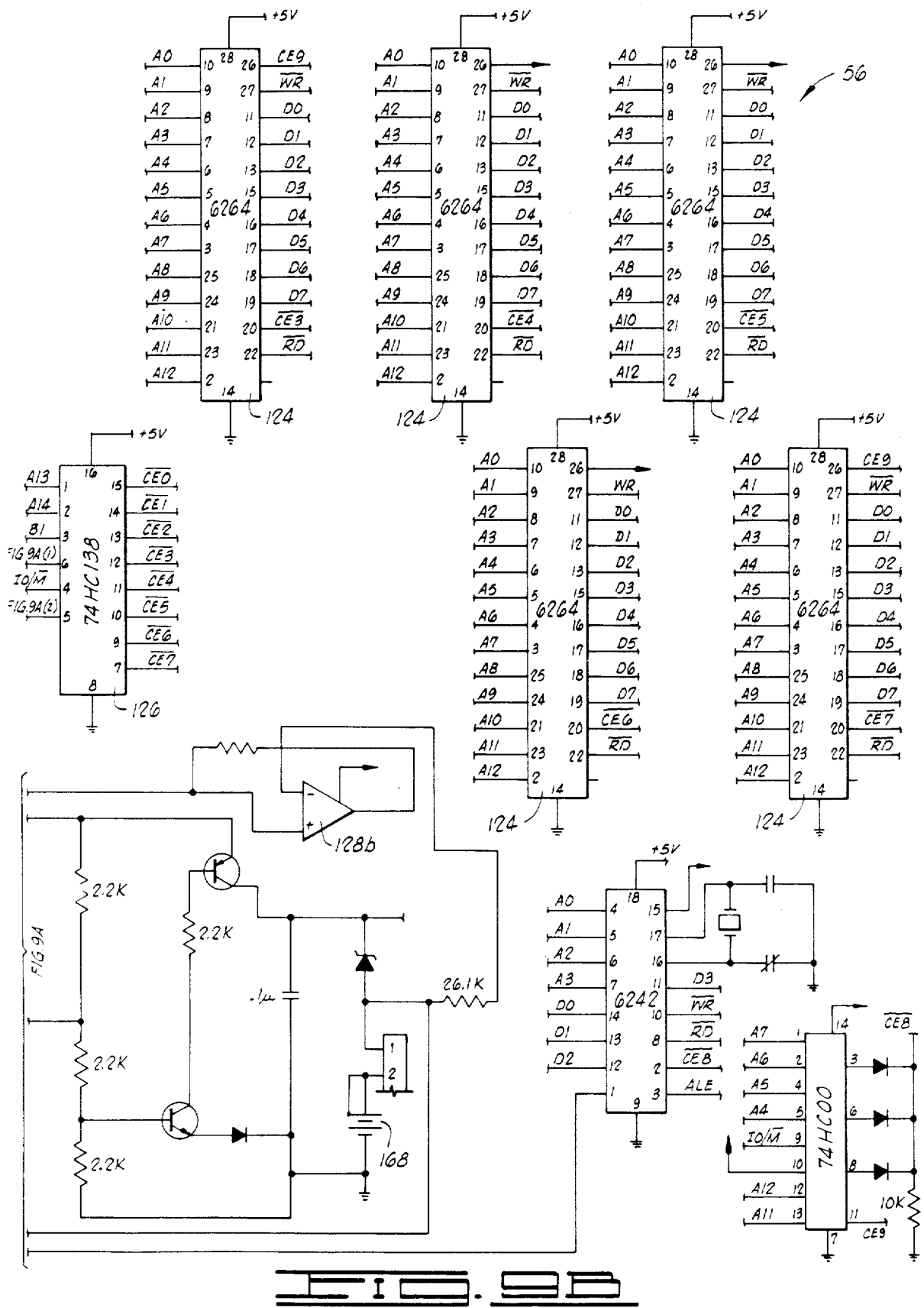

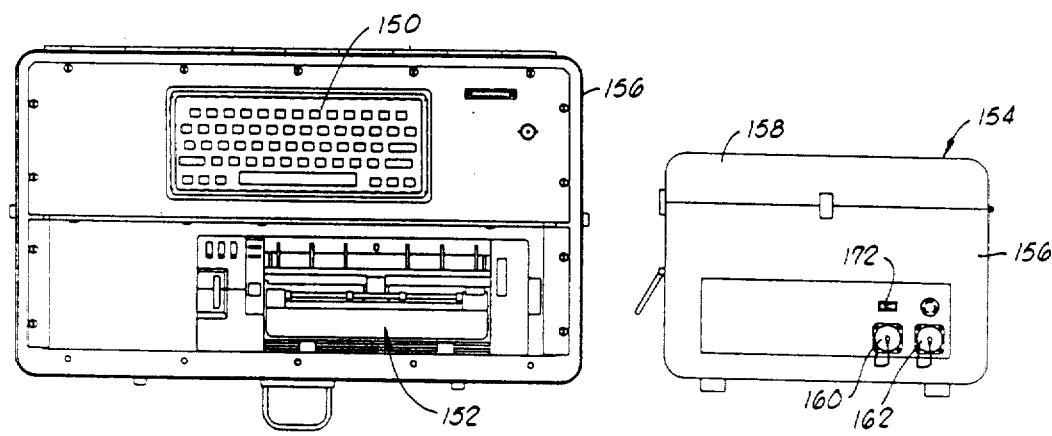
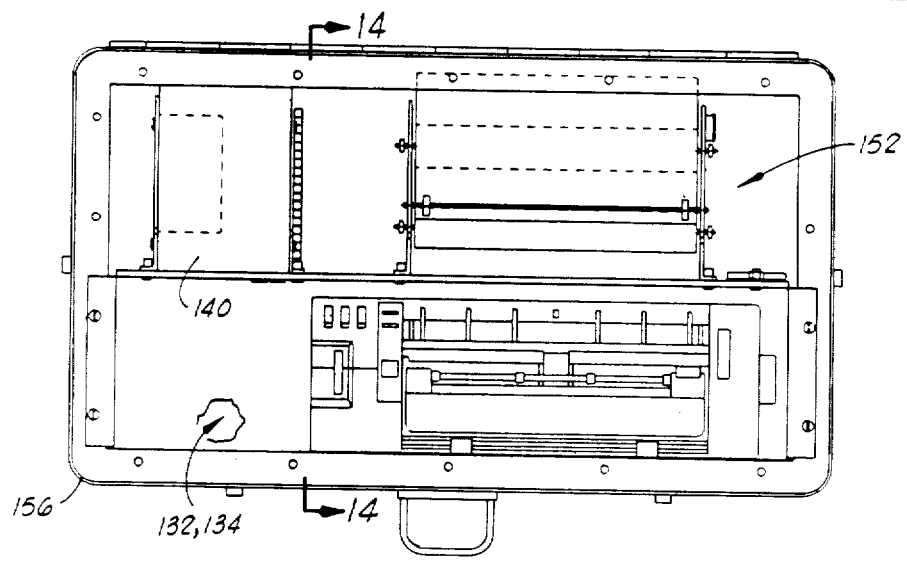
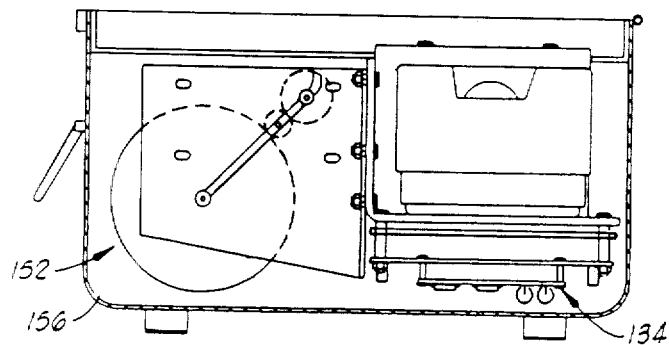

LOCAL AREA NETWORK DATA TRANSFER SYSTEM

BACKGROUND OF THE INVENTION

This invention relates generally to data transfer systems and methods and more particularly, but not by way of limitation, to systems and methods for acquiring data from a flow process, such as a cementing operation, at an oil or gas well site.

To accurately control a process, several conditions or characteristics existing throughout the process need to be monitored so that one knows whether the process is being performed as it should be. For example, during a cementing operation at an oil or gas well site, a cement slurry is produced and pumped into the well. To monitor the quality of the slurry and its placement in the well, various pressures, flow rates and densities associated with the slurry and its flow need to be known. Such a process is carried out over a considerable physical area of the well site, and the conditions or characteristics to be known exist at various spaced locations throughout the process area, so that human observation of locally disposed gauges or readouts would not alone provide satisfactory monitoring of the job. Therefore, there is the need for an automated monitoring system and method by which data representing conditions or characteristics to be monitored can be collected and centrally observed so that more accurate control of the process can be achieved.

This general need has been recognized, and we are aware of two systems which have been proposed particularly for use in monitoring characteristics associated with a cementing job at a well site. The PACR system of Dowell Schlumberger monitors pressure, flow rate and density and provides a graphic display and magnetic tape recording. In this system, each sensor for detecting the respective characteristics requires individual cabling to be run directly to the central recording unit. Furthermore, this system is limited to monitoring three density, three pressure and six flow rate characteristics. Additional characteristics can be monitored, but this requires a complete duplicate PACR system. Another system, the PDR system of Halliburton Company (the assignee of the present invention) has limitations similar to the PACR system.

Although the PACR and PDR systems provide automated monitoring of a number of characteristics associated with a process, they have relatively limited capacities before entire duplicate systems need to be used. Furthermore, if such duplicate systems are used, then there is no one central recording station compiling all the monitored information.

Another shortcoming of the PACR and PDR systems is that they require individual conductors from each transducer or detector to be run to the central recording unit. This is relatively expensive in that such runs of cabling can be long. Such multiple conductors require additional maintenance and can create hazardous situations to personnel when they are strung throughout the well site.

A further limitation is that the PACR and PDR systems are not readily adaptable for accommodating dispersed locations where conditions or characteristics are to be monitored as well as where equipment is to be subsequently controlled to change the conditions or characteristics. That is, these systems are primarily, if not exclusively, unitized data acquisition systems to which multiple cables are run for conveying the monitored signals. They do not include modularized components which can be dispersed throughout a process area for both monitoring conditions and controlling the process.

Therefore, there is the need for an improved system and method which have significant expansion capabilities without requiring entire duplicate systems. This need contemplates a dispersible or modular design. Such modules should be of a type which are to be located where the conditions or characteristics to be monitored exist and they should have both data monitoring as well as equipment controlling capabilities. Such an improved system and method should also be designed so that a large area can be covered without requiring extensive cabling across the area.

SUMMARY OF THE INVENTION

The present invention overcomes the above-noted and other shortcomings of the prior systems by providing a novel and improved data acquisition system and method. This system and method have significant expansion capabilities through their modular implementation. A large area can be covered by respective modules; however, extensive cabling is not needed in view of the unique local area networking design implemented in the present invention. Furthermore, the modules of the present invention can be located within the process environment near where the conditions or characteristics to be monitored exist, but attached to only a single pair of data transmission conductors extending to a central data recording unit. The modules directly associated with the process also have control capabilities by which the process can be controlled.

Broadly, the data transfer system of the present invention includes interface means for communicating with conditions or characteristics of an operation to be monitored; central processing means for receiving information from, and for sending information to, the interface means; and local area network means for connecting the interface means and the central processing means so that the information received from, and the information sent to, the interface means is transferred only through a single information transfer conduit.

In the preferred embodiment, the interface means includes display means, adapted for being located near where a plurality of detectable characteristics are to be monitored, for receiving electrical inputs representing magnitudes of detected ones of the characteristics and for digitally encoding the electrical inputs. The central processing means includes recording means, adapted for being located at a distance from the display means, for recording the digital encodings of the electrical inputs. The local area network means of this embodiment includes a single pair of electrical conductors over which all the digital encodings of the electrical inputs are transferred from the display means to the recording means.

With respect to a flow process at a well site, the present invention also provides a method of acquiring data, which method comprises detecting from spatially separated locations of the flow process a plurality of characteristics occurring within the flow process; converting, at at least one location near the flow process, the detected characteristics into digital electrical signals representing the magnitudes of the detected characteristics; and transferring the digital electrical signals over a single pair of transmission conductors to a single location remote from the flow process.

Therefore, from the foregoing, it is a general object of the present invention to provide a novel and improved data acquisition system and method. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is an illustration of a data acquisition system constructed in accordance with the preferred embodiment of the present invention.

FIGS. 2A-2B are a representative block diagram of the system of the preferred embodiment of the present invention.

FIG. 3 is a plan view of a display unit of the system of the preferred embodiment of the present invention.

FIG. 4 is an end view of the display unit.

FIG. 5 is a sectional elevational view of one of the data acquisition modules contained within the display unit as taken along line 5—5 in FIG. 3.

FIGS. 7A-7B a schematic circuit diagram of the circuit contained on a microprocessor circuit board of the data acquisition module shown in FIG. 5.

FIGS. 8A-8C are a schematic circuit diagram of the circuit contained on an input/output/power board of the data acquisition module shown in FIG. 5.

FIGS. 9A-9B are a schematic circuit diagram of the circuit contained on a random access memory/battery backup board of the data, acquisition module shown in FIG. 5.

FIG. 11 is a plan view of a recorder unit of the system of the preferred embodiment of the present invention.

FIG. 12 is an end view of the recorder unit.

FIG. 13 is a plan view of the recorder unit with the keyboard panel removed.

FIG. 14 is a schematic sectional view of the recorder unit taken along line 14—14 in FIG. 13.

FIG. 16 is a flow chart of a program for controlling a transmission microcomputer of the data acquisition module.

DETAILED DESCRIPTION OF THE PREFERRED EMBODIMENT

Figure 6A:
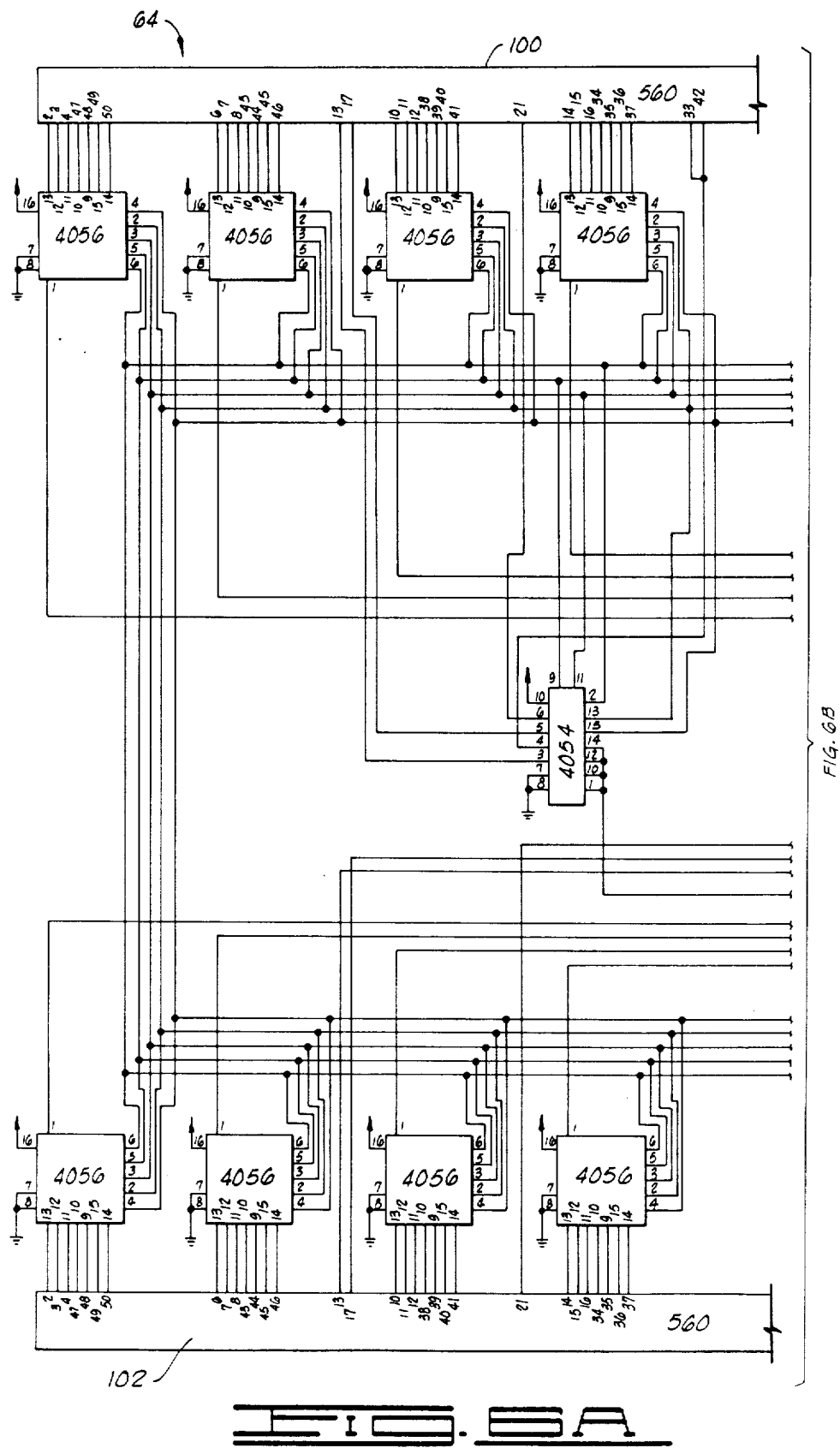
FIGS. 6A—6B are a schematic circuit diagram of the circuit contained on a display board of the data acquisition module shown in FIG. 5.

The data transfer system constructed in accordance with the preferred embodiment of the present invention includes interface means for communicating with an operation, such as an oil or gas well cementing operation which is to be controlled in response to the data transferred through the present invention. Associated with such an operation are different detectable conditions or characteristics. In FIG. 1, the interface means is particularly embodied as a display unit 2, adapted for being located near where a plurality of detectable characteristics are to be monitored, for receiving electrical inputs representing magnitudes of detected ones of the characteristics and for digitally encoding the electrical inputs. These inputs in the preferred embodiment are received from suitable transducers which convert the characteristics, such as pressure, flow rate and density, into the corresponding electrical signals representing the magnitudes or values of the characteristics. In FIG. 1, two pressure transducers 4, 6, two flow rate transducers 8, 10 and a density transducer 12 are illustrated as being connected by suitable electrical conductors to the display means 2. In the preferred embodiment particularly adapted for use in monitoring conditions of a cementing job at an oil or gas well site, the pressure transducer is of a type as known to the art, as are the other transducers, such as flowmeter or tachometer transducers and digital or U-tube densometers. These transducers or, more generally, these detectors have predetermined or predeterminable response characteristics which can be used for calibrating purposes as subsequently described.

The system of the present invention also includes a central processing means for receiving information from, and for sending information to, the interface means. In FIG. 1 the central processing means is shown embodied as a recording unit 14, adapted for being located at a distance from the display unit 2, for recording the digital encodings of the electrical inputs received at the display unit 2.

The data transfer system also broadly includes local area network means for connecting the interface means and the central processing means so that the information received from, and the information sent to, the interface means is transferred only through a single information transfer conduit. This is distinguishable from the PACR and the PDR systems described hereinabove which require individual conduits or conductors from their transducers to their central recording unit. In the FIG. 1 embodiment of the present invention, the local area network means particularly includes a single electrical cable 16 connected between the display unit 2 and the recording unit 14. In the preferred embodiment the cable 16 includes two pairs of electrical conductors. One pair of electrical conductors is dedicated to transferring the digital encodings of the electrical inputs; the other pair is dedicated to indicating the instants in time during which the digital encodings being transferred on the one pair are valid. In the broadest aspects of the present invention, this other pair is not needed for providing a conduit through which the digital data representing the monitored conditions can be transferred, if the validity of the digital encodings is inherent in the manner of encoding or otherwise assured. The local area network means also includes connecting circuitry within the display unit 2 and the recording unit 14 as will be more particularly described hereinbelow.

The structure and methodology of the display unit 2, the recording unit 14 and the local area network interconnect circuit will be more particularly described hereinbelow with reference to the remaining drawings. It is to be noted, however, that the following hardware and software descriptions are not to be taken as limiting the scope of the present invention because it is contemplated that other types of hardware and software can be utilized in practicing the invention.

Display Unit 2

The external appearance of the preferred embodiment of the display unit 2 is shown in FIGS. 3 and 4. The display unit 2 includes a portable housing 18 having a body 20 in which the electrical components of the display unit 2 are contained. The housing 18 also has a removable lid 22 and a plurality of mechanical connectors 24 to which cables are connected for providing electrical continuity into and out of the housing 18. As shown in FIG. 4, the connectors 24 include two pressure transducer connectors 26, 28, two flow rate transducer connectors 30, 32 and one density transducer connector 34. The connectors 24 also include a connector 36 to which the cable 16 is connected and a power-in connector 38 to which an external power cable 39 (FIG. 1) is connected for transferring power from an external power supply to the display unit 2. A power-out connector 40 is also mounted in the side of the body 20 of the housing 18 so that a power cable 41 can be connected to provide power to an external device, such as another display similar to the display means 2 or, as illustrated in FIG. 1, to the recording unit 14. Although FIG. 1 shows the display unit 2 and the recording unit 14 sharing power from the external power supply via the cable 41, it is contemplated that this will be done only when the two units are relatively close together. When the units 2, 14 are in the field and spaced across a well site from each other, the more likely configuration will be for each to have its own local external power supply (e.g., a truck battery) connected thereto. This configuration reduces the "long-distance" cabling to just the single data transmission cable 16, thereby maximizing the reduced cabling advantage of the present invention over the PACR and PDR systems.

Although not shown in the drawings, another connector is contemplated to be included on the housing 18. This connector will permit different display units to be locally interconnected in a manner which permits each display unit access to the single data transmission cable 16 which runs from only one of the display units to the single recording unit 14. That is, in the system of the present invention, a plurality of display units 2 can be interconnected in a daisy chain manner whereby only a single cable 16 needs to be run from one of the display units to the recording unit 14. When additional display units 2 are used, the monitored data from the other units are transferred onto the cable 16 through branch information transfer conduits or cables similar to but shorter than the cable 16. These branch cables are physically connected between two of the display units 2, but ultimately in communication with the single information transfer conduit 16 extending to the recording unit 14. Each such branch information transfer conduit has a length which, in the preferred embodiment, is substantially shorter than the length of the single information transfer conduit 16 so that all the display units remain within substantially the same environment of the monitored process. That is, all of the display units are relatively closely located since they are used to detect different characteristics associated with the overall operation they are monitoring. Thus, all the display units are located within the environment of the monitored operation; however, the single recording unit 14 used with all of the display units is remotely located outside of the immediate environment or vicinity of the operation so that the recording means 14 need not be constructed to withstand whatever adverse conditions might exist within the environment of the monitored operation. In the preferred embodiment, the overall system is expandible to accommodate thirty-two inputs on the single pair of data transmission conductors in the cable 16.

Contained within the housing 18 of each display unit 2 are three data acquisition modules 43. In the preferred embodiment these data acquisition modules define pressure data acquisition means for receiving and encoding at least one pressure signal, flow rate data acquisition means for receiving and encoding at least one flow rate signal, and density data acquisition means for receiving and encoding at least one density signal. Each of these data acquisition modules is connected to the single pair of electrical conductors defining the monitored data transferral conduit contained within the cable 16.

Data Acquisition Module 43

Although each data acquisition module might be adapted to receive and encode a different type of characteristic (e.g., pressure, flow rate or density), each module is a similarly constructed apparatus having the components generally identified in FIG. 2A. Broadly, each data acquisition module comprises input means for receiving electrical signals from at least one transducer (it should be noted, however, that a data acquisition module has uses other than acquiring data so that it is operational even without being connected to any transducers; for example, a module could simply provide a clock or an alarm clock function or it could perform mathematical operations on data inputs based on internally stored tables of information). Each module further comprises digital storage means for storing digital signals corresponding to the electrical signals received by the input means; control microcomputer means, connected to the input means and the digital storage means, for transferring the digital signals into the digital storage means; and transmission microcomputer means, connected to the digital storage means, for transferring the digital signals out of the digital storage means onto a transmission line. The digital storage means defines connector means for connecting the control microcomputer means, which performs direct communications with the oil or gas well operation in the preferred embodiment, and the transmission microcomputer means, which passes the information to the recording unit 14.

As shown in FIG. 2A, the input means includes two connectors for connecting to two transducers. For the pressure data acquisition module of the display means 2, these two connectors are the connectors 26, 28, whereas for the flow rate data acquisition module, these two connectors are the connectors 30, 32. In the preferred embodiment, FIG. 4 shows that only one connector (i.e., connector 34) is associated with the density data acquisition module; however, the density data acquisition module has the general configuration shown in FIG. 2A.

The input means of each data acquisition module 43 also includes digitizing means for connecting the two connector means with the control microcomputer. In FIG. 2A, the preferred embodiment of the digitizing means is shown as being adapted for receiving two different types of transducer outputs. One is a voltage or current output and the other is a frequency output. To accommodate the voltage or current output, the digitizing means includes a voltage to frequency converter 42 which converts the respective transducer signal into an electrical signal having a frequency. To accommodate the frequency transducer output, the digitizing means includes an amplify and square means 44 for providing another electrical signal having a frequency in response to the applied frequency signal from the respective frequency transducer. Also included within the digitizing means is a counter means 46 for providing a digital signal to the control microcomputer in response to the frequency of one of the two electrical signals provided by the voltage to frequency converter 42 and the amp and square circuit 44. To selectably connect one of these two signals to the counter means 46, the digitizing means further includes switch means 48.

The digital storage means of each data acquisition module 43 constructed in accordance with the preferred embodiment of the present invention includes a dual port random access memory 50 having a first port connected to the control microcomputer and having a second port connected to the transmission microcomputer. The random access memory 50 provides commonly accessible storage locations in which information is stored by one of the two microcomputers and retrieved by the other of the two microcomputers. Such other one of the microcomputers is actuated to retrieve the information by monitoring a respective status word contained in a predetermined storage location within the random access memory 50. In the preferred embodiment there is a status word storage location in which the control microcomputer writes to actuate the transmission microcomputer to perform a function on the memory, and there is a second status word storage location different from the first one, in which the transmission microcomputer writes a second status word to actuate the control microcomputer to perform a function on the random access memory 50.

The control microcomputer is shown in FIG. 2A as including a microprocessor 52 connected to the counter 46 and the random access memory 50. The microprocessor 52 is also connected to program storage means 54 for retaining a program to operate the microprocessor 52, and the microprocessor 52 is connected to a random access memory 56 having a capacity for storing up to several hours of monitored data (of course, such capacity need not always be fully used because transfers over the cable 16 to the recording unit 14 for storage in the memory there can be made).

Associated with the control microcomputer, and forming another part of the data acquisition module 43, is a serial transmitter and receiver means 58 for transmitting external information from and receiving external information for the microprocessor 52 separately from that information transferred via the random access memory 50. A parallel input/output means 60 for providing local information transfer to and from the microprocessor 52 is also included in the module 43. Through the I/O circuit 60, analog switches 62 and a display 64 are controlled and inputs from a keyboard 66 are received. Also connected to the microprocessor 52 are digital to analog conversion means 68 for providing analog control signals to one or more external devices in response to the monitor microcomputer. Each module 43 is also designed for having internal power supply capabilities as indicated by the power supplies 69 included in FIG. 2A.

The transmission microcomputer is shown in FIG. 2A as including a microprocessor 70 connected to the random access memory 50; program storage means 72, connected to the microprocessor 70, for retaining a program to operate the microprocessor 70; random access memory 74 connected to the microprocessor 70; and serial input/output means 76 also connected to the microprocessor 70. The serial input/output means 76 communicates the digital signals from the digital storage means defined by the random access memory 50 to the common pair of conductors in the cable 16. Time data is also communicated through the serial input/output means to another common pair of conductors of the transmission line. This is indicated by the LAN (local area network) block in FIG. 2A.

These elements of each data acquisition module 43 are mounted in a housing 78 (FIG. 5) having a receptacle member 80 and a detachable cover member 82 in which two display openings 84, 86 are defined and to which the keyboard 66 is retained. Vertically arrayed within the receptacle member 80 are a plurality of printed circuit boards on which the circuits defining the aforementioned elements of the data acquisition module 43 are mounted. These boards include: (1) a display board 88 having display circuit means mounted thereon for providing a visual output observable through the two display openings 84, 86; (2) a control microcomputer board 90 having the microprocessor 52 and related circuitry mounted thereon for receiving inputs from the keyboard 66 and for controlling the display circuit on the board 88; (3) an input/output/power board 92 having the various aforementioned input and output circuits mounted thereon as well as having power input circuit means mounted thereon for providing suitable electrical voltage to the data acquisition module in response to the external power source; (4) a local area network board 94 having the random access memory 50 and the microprocessor 70 and its related circuitry mounted thereon; and (5) a random access memory board 96 having the random access memory bank 56 mounted thereon for storing data received from the microprocessor 52 and having internal power supply circuit means for energizing the random access memory 56 when the power input circuit on the board 92 is not providing electrical energy to the data acquisition module 43. A termination board 98 is also included with the enclosure defined by the housing 78. Each of the boards 88–96 and their related circuits will be more particularly described with reference to FIGS. 6–10, in which drawings the circuits defining the elements shown in FIG. 2A are identified by the same reference numerals used in FIG. 2A. These boards will be further described as follows; however, a more detailed description of these circuits and their operation will not be given because they are apparent from the drawings.

Display Board 88

Figure 6B:
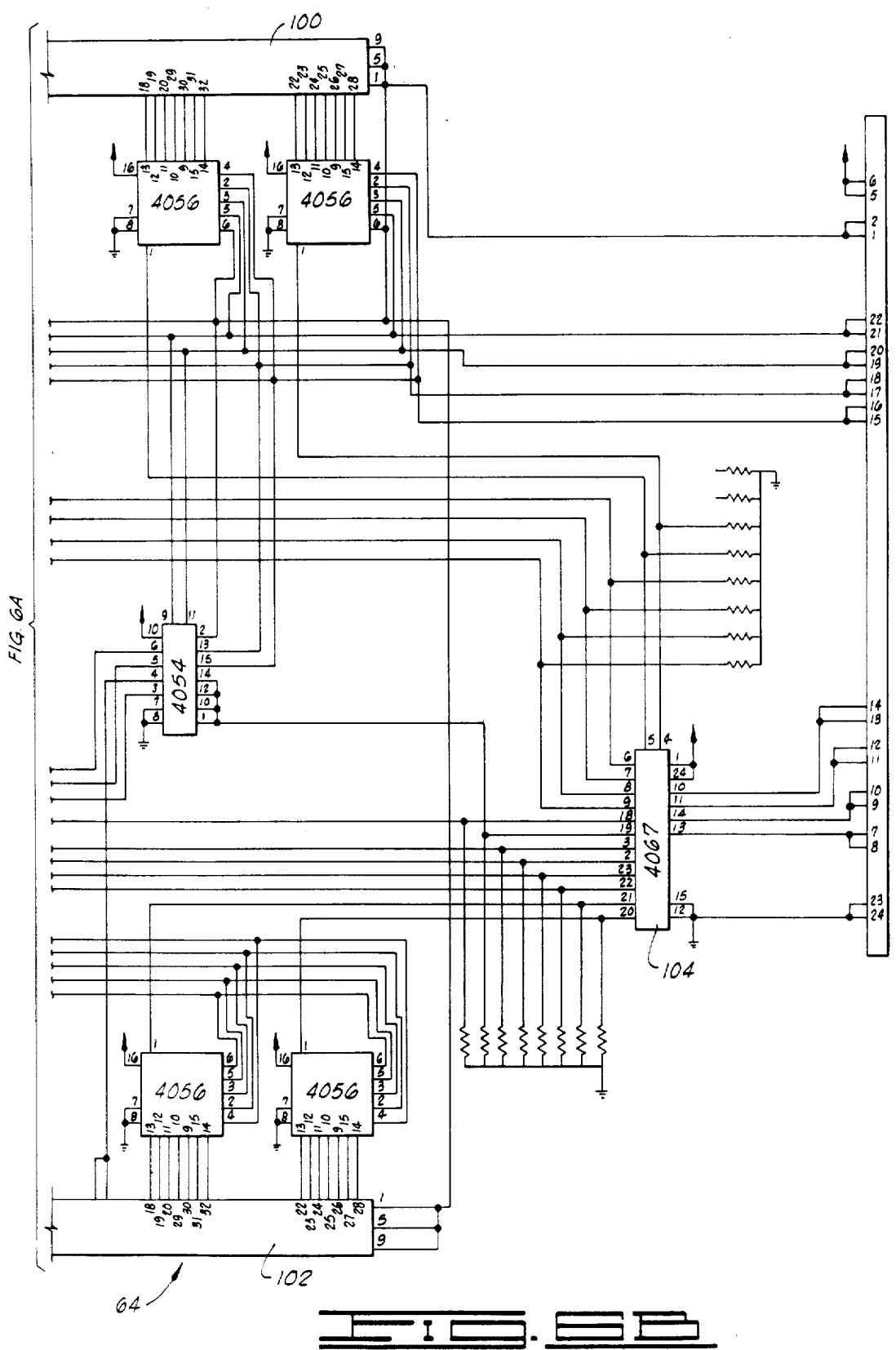

The circuit for the display board 88 is shown in FIGS. 6A–6B. The circuit includes two 6-digit liquid crystal displays 100, 102 visible through the display openings 84, 86. The board operates by decoding with a decoder 104 the upper four bits of an 8-bit byte. The lower four bits of the byte are the bcd digits to be displayed. Three decimal points can be driven by the decoder. The addresses are:

| | |
|---|---|
| 0 | Upper Display, First Digit (Leftmost) |
| 1 | Upper Display, Second Digit |
| 2 | Upper Display, Third Digit |
| 3 | Upper Display, Fourth Digit |
| 4 | Upper Display, Fifth Digit |
| 5 | Upper Display, Sixth Digit (Rightmost) |

-continued

| | | | |
|---|---|---|---|
| 6 | Lower Display, First Digit (Leftmost) | | |
| 7 | Lower Display, Second Digit | | |
| 8 | Lower Display, Third Digit | | |
| 9 | Lower Display, Fourth Digit | | |
| 10 | Lower Display, Fifth Digit | | |
| 11 | Lower Display, Sixth Digit (Rightmost) | | |
| 12 | Lower Display Decimal Point | | |
| 13 | Upper Display Decimal Point | | |
| 14 | Unused | | |
| 15 | Unused | | |
| The digits displayed are: | 0 = '0' | 8 = '8' | |
| | 1 = '1' | 9 = '9' | |
| | 2 = '2' | 10 = 'L' | |
| | 3 = '3' | 11 = 'H' | |
| | 4 = '4' | 12 = 'P' | |
| | 5 = '5' | 13 = 'A' | |
| | 6 = '6' | 14 = '—' | |
| | 7 = '7' | 15 = BLANK | |

This board is driven by the microprocessor 52 through the I/O port 60. The board requires +5 VDC for operation.

Microcomputer Board 90

The control microcomputer board 90 is shown in FIGS. 7A–7B; its major components are an 80C85 CPU (the microprocessor 52), an 81C55 RAM/IO/Timer (the I/O means 60), an 82C53 triple counter (the counter means 46), a 27C256 EPROM (the program storage means 54), an 82C51 UART (part of the serial transmitter and receiver means 58), and two AD558 eight-bit DAC's (the digital to analog converter means 68):

80C85—CMOS version of the Intel 8085. Address range is 65,536 bytes. Word length is eight bits. Interrupts are RST7.5 and RST5.5 (used as the interrupt for a debugging program). All other interrupts are disabled. The crystal frequency is 3,579,545 Hz. The CPU clock frequency is ½ the crystal frequency. RST7.5 should occur ten times per second. RST5.5 should be always low.

81C55—CMOS version of the Intel 8155. It has two eight-bit ports, a 6-bit port, and a 14-bit timer. The timer divides the CPU clock down that is used by the 82C51 in determining a baud rate. The ports are divided into two eight-bit ports and one six-bit port as follows:
Port A = 8 bits
Port B = 8 bits
Port C = 6 bits
Port A is used for controlling the display 64, and the upper half of Port B and the lower four bits of Port C get a key value from the keyboard 66 by a scanning of the rows and columns. The rest of Ports B and C are used for control functions on the input/output/power board 92 and the memory board 96. The lower four bits of Port B are latched by the two upper bits of Port C on the input/output/power board 92. Only bit 4 of Port C is used for latching and it only latches bits 1 and 0 of Port B. The Port Addresses are:
Control = 70H (160 OCTAL)
Port A = 71H (161)
Port B = 72H (162)
Port C = 73H (163)
TIMERLO = 74H (164)
TIMERHI = 75H (165)

82C53—CMOS version of the Intel 8253. This is a triple sixteen-bit counter. Counter 0 is used to generate the RST7.5 interrupts. The input to the Counter 0 is a frequency derived from a 4020 ripple counter running of the CPU clock. This 4020 also generates 60 Hz for the display board 88 backplane. The frequency going into the Counter 0 is the CPU clock divided by 32. Counter 2 is connected to the output of the density amp and square on the input/output/power board 92 or the VFC100 or regular amp and square (selectable through the 4052 analog switch 48 in FIG. 8A). Counter 1 is connected to the voltage to frequency converter for channel 1 or the amp and square (selectable through the 4052 analog switch 48 in FIG. 8A). Counter 1 was designed to work with the voltage to frequency converters to measure pressure on a 4–20 mA signal. While this chip has three sixteen-bit counters and one control register, it only takes up four port addresses. They are:
Control Reg = 63 hex (143 octal)
Counter 2 = 62 hex (142 octal)
Counter 1 = 61 hex (140 octal)
Counter 0 = 60 hex (140 octal)
Reading twice from the counter address obtains a sixteen-bit counter result.

27C256—CMOS 32768 X eight-bit EPROM. This EPROM occupies Memory Region 0-7FFF hex (77777 octal). It has interrupt jump instructions, the debug program, and a lookup table for the keyboard along with the main PASCAL operating program.

82C51—CMOS version of the Intel 8251. This chip is a programmable communication interface. It is used for serial communications to external devices. The input/output lines (3, 17, 19, 23) are buffered on the input/output/power board. The port address for the 82C51:
Control Status Register = 51 hex (121 octal)
Data Register = 50 hex (120 octal)

AD558—These eight-bit DAC's provide a 0-2.55 volt output that is controlled by an eight-bit word from the CPU. The port addresses are:
Channel 1 = 40 hex (100 octal)
Channel 2 = 30 hex (60 octal)

Three other chips are on this board along with several connectors. The 74HC138 chip 106 is a CMOS decoder similar to the 74LS138. It decodes the CPU port address space into eight blocks: the first three blocks are unused; the fourth is used by the channel 2, eight-bit DAC; the fifth block is for the channel 1, eight-bit DAC; the sixth is for the 82C51; the seventh is used for the 82C53; and the eighth block is used for the 82C55. The 74HC373 chip 107 is used for latching the lower eight bits of address. This is a requirement from the 80C85 bus structure. The 4020 chip 108 is used to divide the system clock for interrupt timer and LCD backplane.

Input/Output/Power Board 92

Figure 8B:
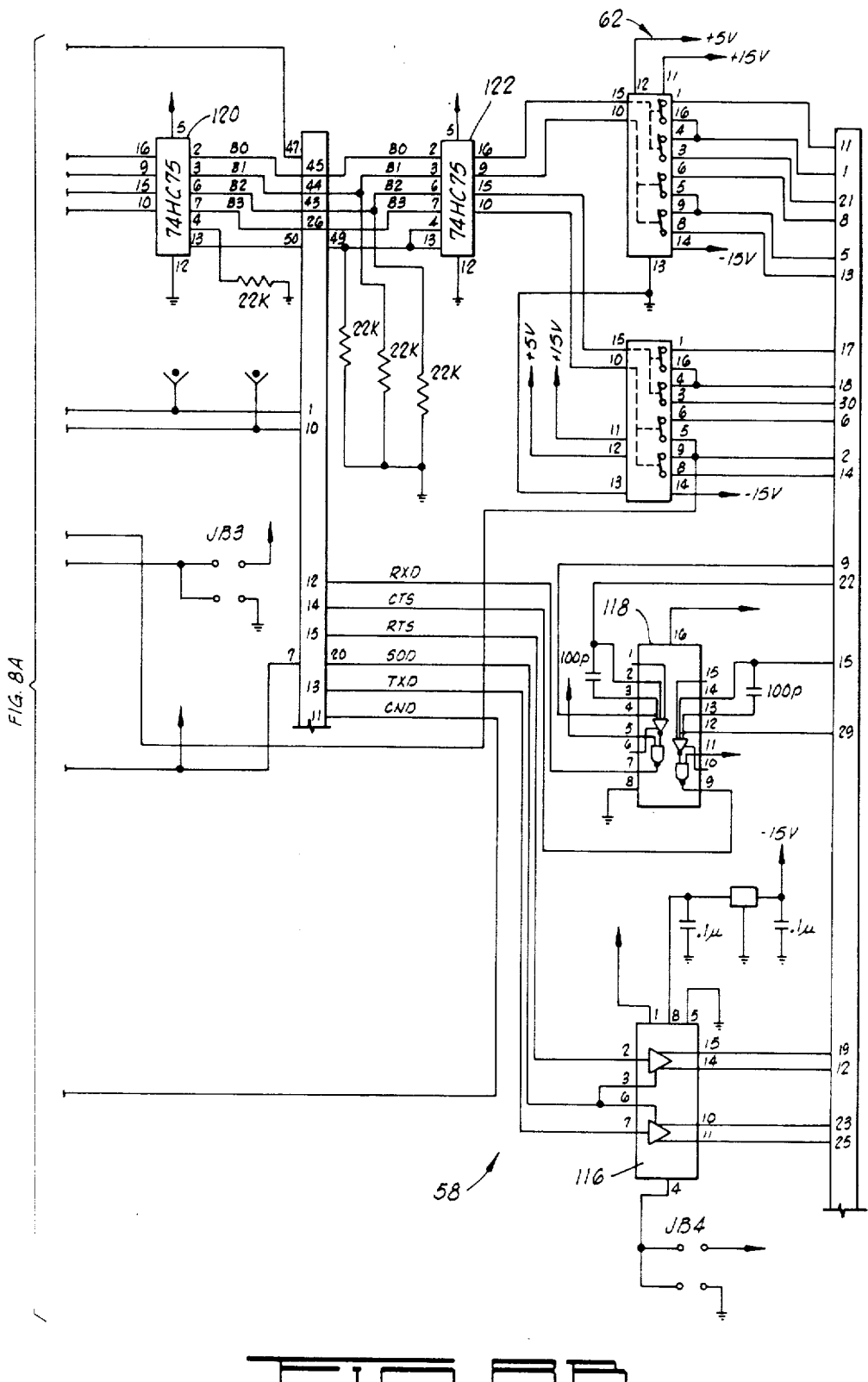

The input/output/power board 92 shown in FIGS. 8A–8C has the functions required for conditioning of (a) external power, (b) 4–20 mA signals, (c) low level, low frequency pulses, (d) high level high, frequency pulses, (e) RS-422 buffering, and (f) analog output switching. It provides the path for signals to move into or out of the housing 78 of the module 43. The VFC100 (the voltage to frequency converter 42—FIG. 8A) is for the 4–20 mA conversion. The LM211's and LM219 (the amplify and square means 44—FIG. 8C) are for the frequency conditioning. The JB1, JB2, JB3 jumpers on the board select between a flowmeter signal or a digital p/m tube from the densometer. The 7805 device 110 (FIG. 8A) takes the raw battery voltage obtained through the connector 38 down to a regulated five volts. The DC-DC converter 112 changes the voltage to + and −15 volts. The power cube 114 changes the voltage to about 90 VAC. This is used to backlight the displays 100, 102. The DS1691 chip 116 (part of the serial transmitter and receiver means 58) buffers the RS-423 or RS-422 output. The 78C120 chip 118 (another part of the means 58) receives serial signals from external devices. Jumper JB4 selects RS-423 or RS-422 transmission. The 74HC75 chips 120, 122 are latches that are used to turn the analog switches 62 on and off.

Random Access Memory Board 96

Figure 9A:
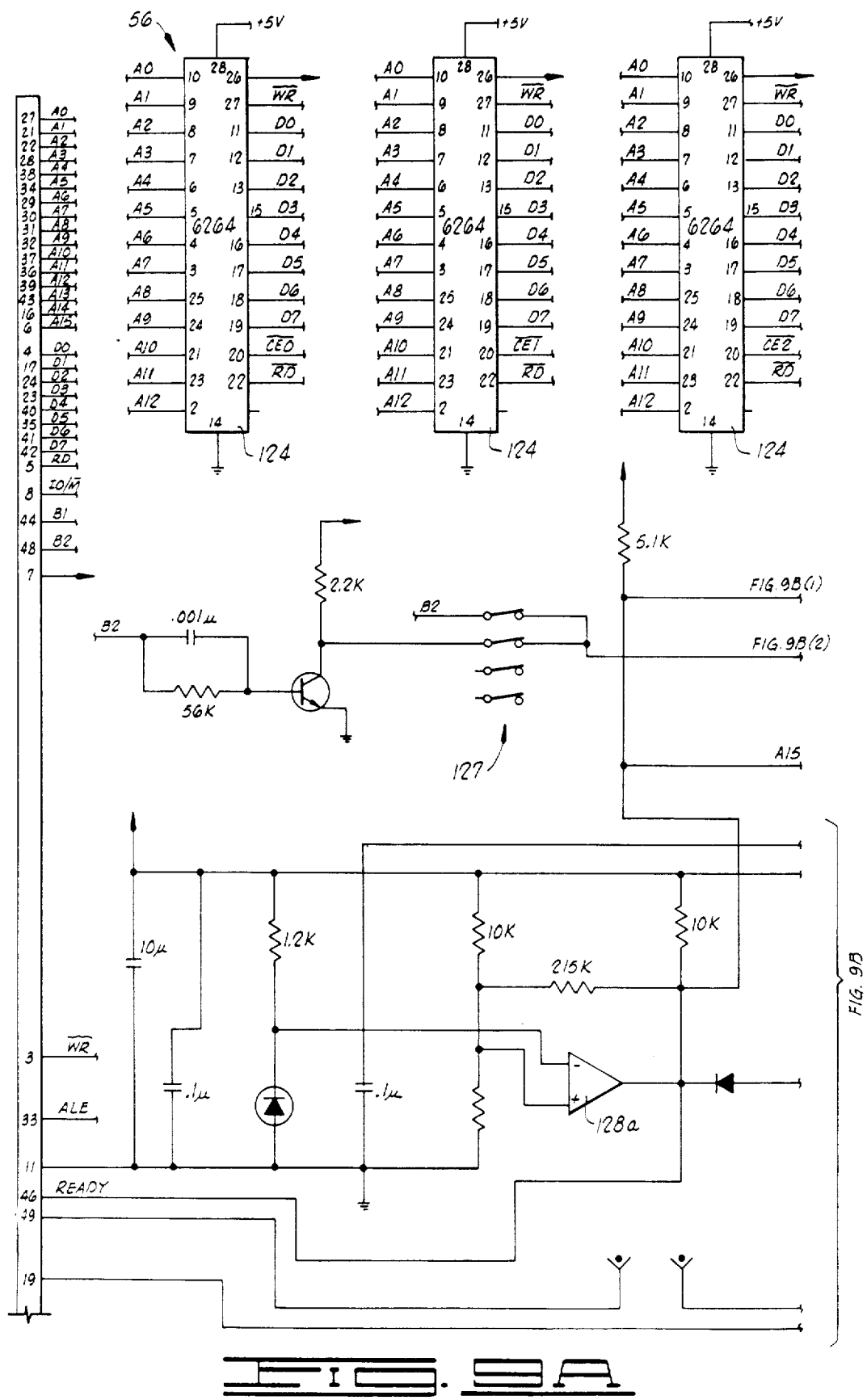

The random access memory board 96 has eight 8K×8-bit CMOS static RAM chips 124 as shown in FIGS. 9A–9B. The decoding of the chips 124 is done by a 74HC138 chip 126. The switches 127 on the board make it possible to be bank selected by the 81C55 on the CPU board 90. For battery backup to retain the contents of the chips 124 in the event of a primary power outage, the battery jumper should be in place and the LM393 dual comparators 128a, 128b should be in place.

Local Area Network Board 94

Figure 10A:
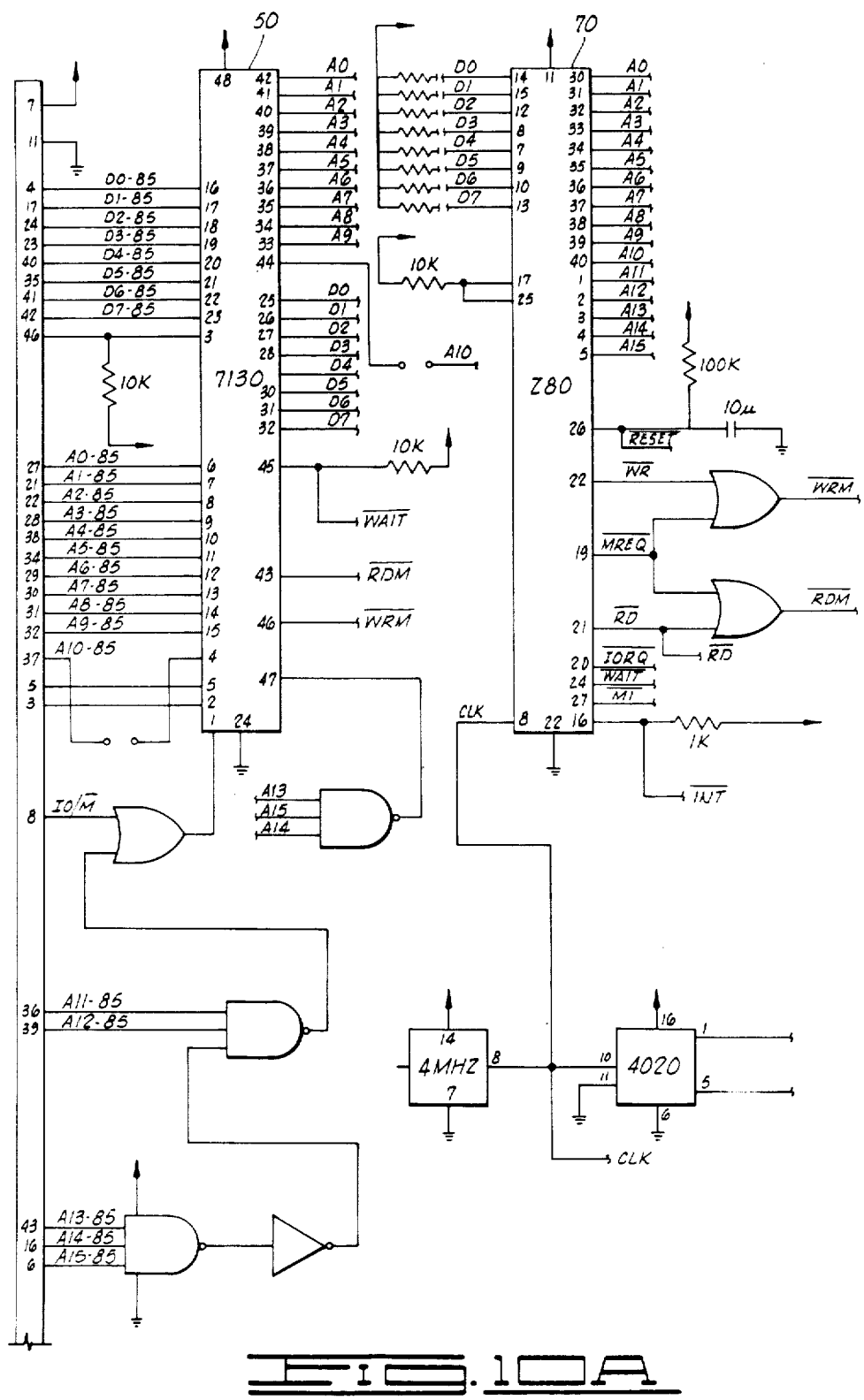
FIGS. 10A-10B are a schematic circuit diagram of the circuit contained on a local area network board of the data acquisition module shown in FIG. 5.
Figure 10B:
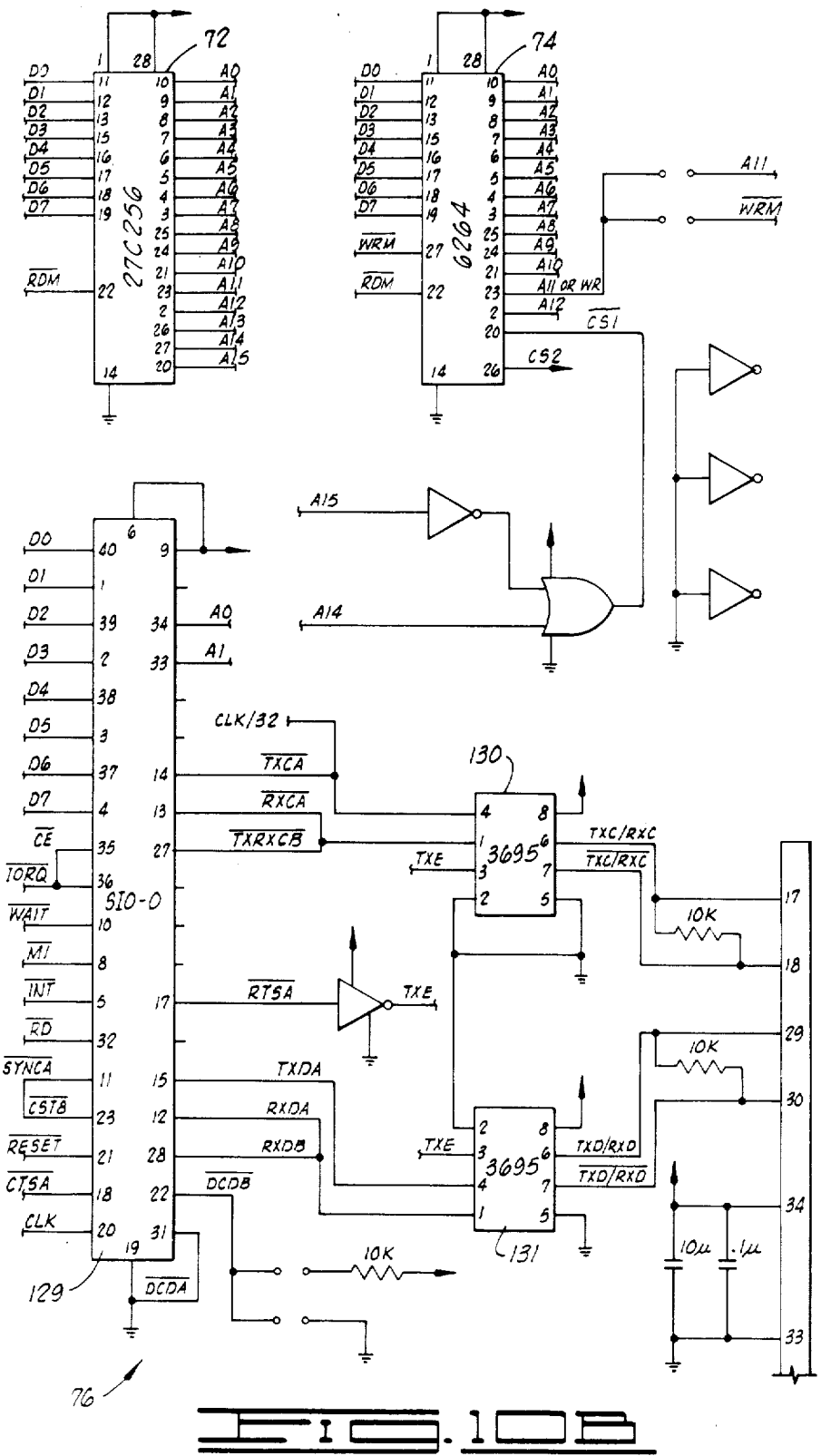

The circuit of the this microprocessor-based local area network board 94 shown in FIGS. 10A–10B runs a program stored in an EPROM (the program storage means 72). This program transfers information from a dual port RAM (the random access memory 50) out RS-485 line drivers to the cable 16, and it receives data from the RS-485 line of the cable 16 and places it in the dual port RAM. The principal components of this board include:

7130—(dual port RAM 50) 1K of static RAM which can be accessed by both microprocessors 52, 70. It is decoded at location F800-FBFF in the data acquisition module 43 and E800-EBFF in the recording unit 14.

Z80—(microprocessor 70) A CMOS 8-bit microprocessor which does all calculations and executes instructions to satisfy a part of SDLC LAN protocol to transmit data over an RS-485 balanced line (the twisted pair of conductors in the cable 16).

27C256—(program storage means 72) 32K EPROM for software storage.

SIO—(chip 129, part of serial input/output means 76) Changes data from serial to parallel and vice versa and implements part of the hardware requirements for the SDLC protocol.

6264—(random access memory 74) 8K CMOS RAM at memory location 8000-9FFF for microprocessor stack, scratch pad, etc.

DS3695—(devices 130, 131 part of serial input/output means 76) Data and clock conditioners to meet RS-485 hardware requirements for high speed serial transmission over a balanced line.

Terminator Board 98

The receptacle member 80 of the housing 78 has a permanently connected printed circuit board (the terminator board 98) that connects the outside world with the internal circuitry of the data acquisition module 43 by pins ultrasonically welded through the back of the shell. These pins are then soldered to the terminator board 98. A 34-pin ribbon cable carries the signals up to the other boards in the module 43.

Although the data acquisition module 43 forms an integral part of the overall data acquisition system described herein, the module 43 can be used in a stand-alone data acquisition mode. For example, the module 43 can be connected to a transducer and a power supply and allowed to collect data and retain the data in its internal memory. This same module can be used from job to job to collect and internally store data from the various jobs (making sure that the maximum internal storage capacity is not exceeded so that data from the earlier jobs are not overwritten and lost). At some suitable future time, this module can be connected to a suitable device, such as the recording unit 14, for transferring the data which have been collected and stored in the module.

The data acquisition module 43 can also be used as a controller for outputting control signals to control the monitored process, for example. With respect to the illustrated preferred embodiment, control signals can be provided through the analog switches 62 or the digital to analog converters 68, for example.

Recording Unit 14

The recording unit 14 is shown in FIG. 2B as including a local area network board 132 constructed similarly to the board 94 in the data acquisition module 43 of the display unit 2. The circuit 132 couples with the local area network cable 16. The recording unit 14 also includes a single board microcomputer system 134 utilizing two floppy disk drives. FIG. 2B shows that the microcomputer system 134 includes a Z80 microprocessor 136, a 4K EPROM 138 for program storage, and a dual floppy disk controller and drive means 140 for receiving a magnetic storage disk (particularly, a miniature floppy diskette in the preferred embodiment) on which at least part of the information received from the display unit 2 is to be stored. The microcomputer system 134 also includes a monitor interface circuit including another EPROM 142, a video random access memory 144, and a CRT controller 146. A parallel input/output circuit 148 communicates with a keyboard 150 and a printer 152. A serial input/output circuit 151 provides a communication path to external devices, such as a remote computer. A 128K random access memory 153, having a memory management chip (MMC), is also included in the recording unit 14. These elements are of types as known to the art. Particularly, the single board microcomputer system 134 of the preferred embodiment is the Model MSC-ICO single board computer from Mountain Side Computer.

The aforementioned elements of the recording unit 14 are contained in a portable housing 154 as shown in FIGS. 11–14 (it is to be noted that in other specific implementations of the recording unit 14, the components can be positioned differently in the housing 154, such as by moving the keyboard 150 and the printer 152 to the left side and moving the disk drive to the right side, which left and right sides are as the housing 154 is oriented in FIG. 11, for example). The housing 154 is a suitable carrying case including a body 156, a removable lid 158 and two connectors 160, 162. The connector 160 couples with the local area network cable 16, and the connector 162 couples with the power cable 40, which as previously described runs to the display unit 2 or to a closer external power supply. The disk drives of the means 140, the keyboard 150 and the printer 152 of the recording unit 14 are mounted in the housing 154 as indicated by their identifying reference numerals shown in FIGS. 11, 13 and 14. The circuit boards containing the LAN connections and the single board computer are mounted below the illustrated components as indicated in FIGS. 13 and 14.

The floppy disk drive is used in the preferred embodiment to record data every one second with respect to each data acquisition module 43 so that a complete history is obtained. A total of seven hours of storage can be placed on one of the floppy disks used in the preferred embodiment. In this preferred embodiment, the floppy disk drive is a Sony Model MP-F53W drive.

The printer 150 is an Epson HS-80 printer controlled for creating strip chart-like printouts. The keyboard 152 is an Advanced Input Devices Model MK-059 alphanumeric encoded keyboard.

Local Area Network Cable 16

The local area network means has been previously described as being embodied in the preferred embodiment as a single data transfer cable 16 including a single pair of wires (identified in FIGS. 2A-2B by the reference numeral 164) over which the monitored data are transferred. In the preferred embodiment the length of the cable 16 is up to 2,000 feet. More generally, the cable provides a single information transfer conduit which has a suitable length sufficient to allow the recording unit 14 to be located beyond the immediate environment of the oil or gas well operation (or other operation) when the display unit 2 is located within such immediate environment so that the ability of the recording unit 14 to operate is not adversely affected by the operation. Only this one long data transmission cable is required in the present invention because all other cabling is through shorter branch cables connected from one display unit to another in a daisy chain microprocessor 136. Broadly, the program for the microprocessor 52 causes it to operate so that the data from each transducer monitored thereby is gathered six times per second. The program of FIG. 16 controls the microprocessor 70 so that it continually loops until the RAM 50 status word it is monitoring is changed by the microprocessor 52, thereby causing the microprocessor 70 to obtain the data from the random access memory 50 and store it in the random access memory 74 until a command is received from the microprocessor 136 of the recording unit 14. The control program for the microprocessor 136 operates so that data are retrieved from the display unit 2 and concurrently displayed through the printer 152 and stored on a floppy disk in the controller and drive means 140. The configurations of the memories in which these programs are stored and through which memories these programs operate are specifically represented by the memory and input/output maps shown along the right-hand edge of FIGS. 2A-2B.

In a specific embodiment, the software for the display unit 2 implements a portion of the known SDLC protocol using the following parameters:

(1) The dual port RAM 50 interfacing between the Z80 microprocessor 70 and the data collection system under control of the microprocessor 52 is memory mapped at F800-FBFF hex.

(2) A data transmission is configured with the following header:

| | UNIT ADDRESS | USE LATER | DATA LENGTH | COMMAND ID | DATA ID | EVENT CODE | |
|---|---|---|---|---|---|---|---|
| F800 | Byte 00 | Byte 01 | Byte 02 | Byte 03 | Byte 04 | Byte 05 | Data (length in byte 2) |
| | Range 0-1F and FF | | | | | | | configuration. This reduces cabling costs and maintenance requirements as well as reducing cabling congestion across the area in which the present invention is used.

Although only a single pair of wires is needed to transfer the monitored data in the broadest aspects of the data transfer system, in the preferred embodiment the cable 16 includes a second pair of conductors (identified by the reference numeral 166 in FIGS. 2A-2B) for transferring timing signals between the display unit 2 and the recording unit 14. These timing signals are used to synchronize the high speed data transfer occurring on the conductor pair 164.

Although the preferred embodiment is specifically described as including "wires," which might imply a metallic composition, it is also contemplated that the transfer or conductor medium can be any suitable means, which might be of a material other than metallic wires, such as a fiber optic transmission medium.

Software

Figure 15:
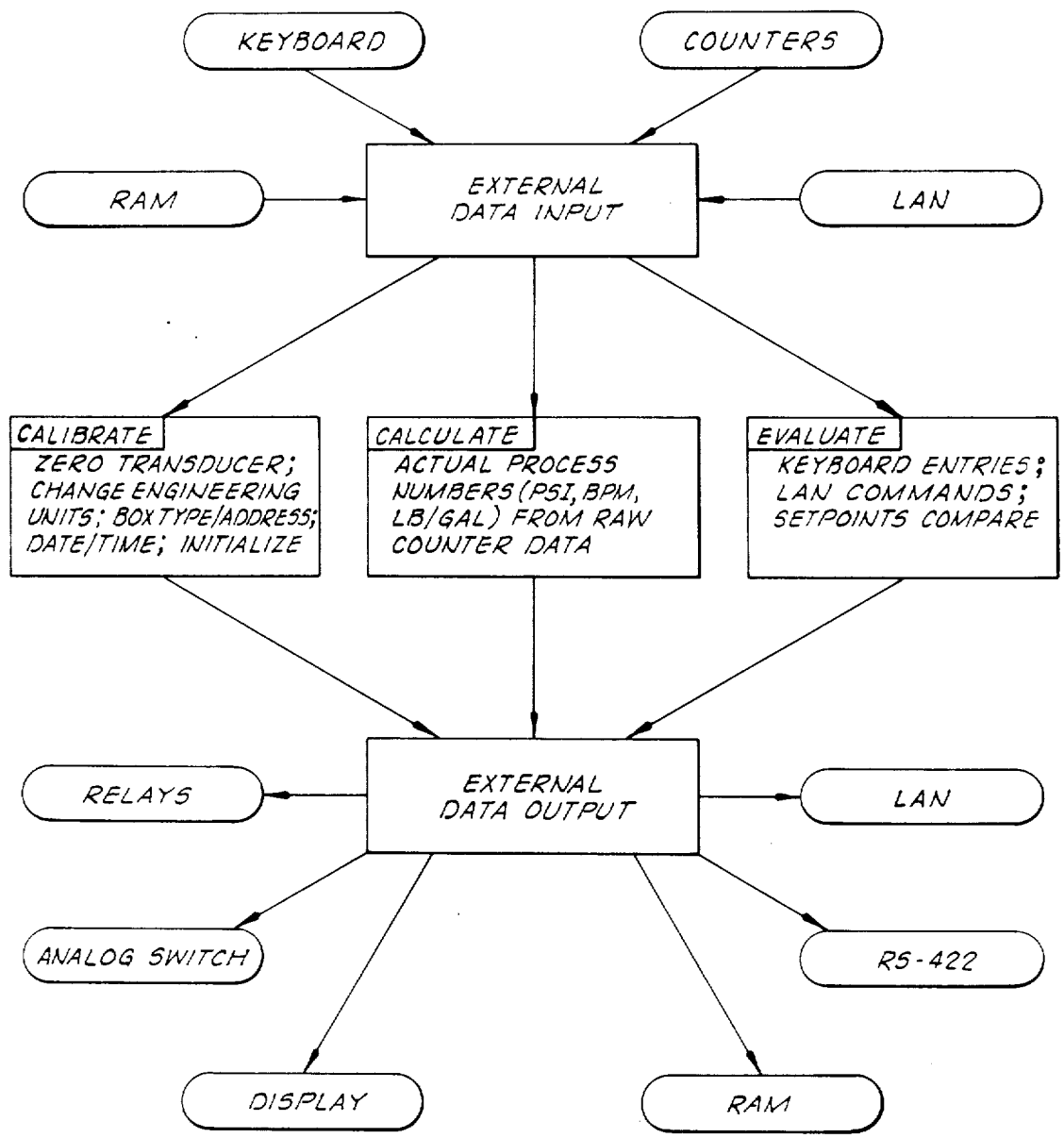
FIG. 15 is a flow chart of a program for controlling a control microcomputer in the data acquisition module.
Figure 18:
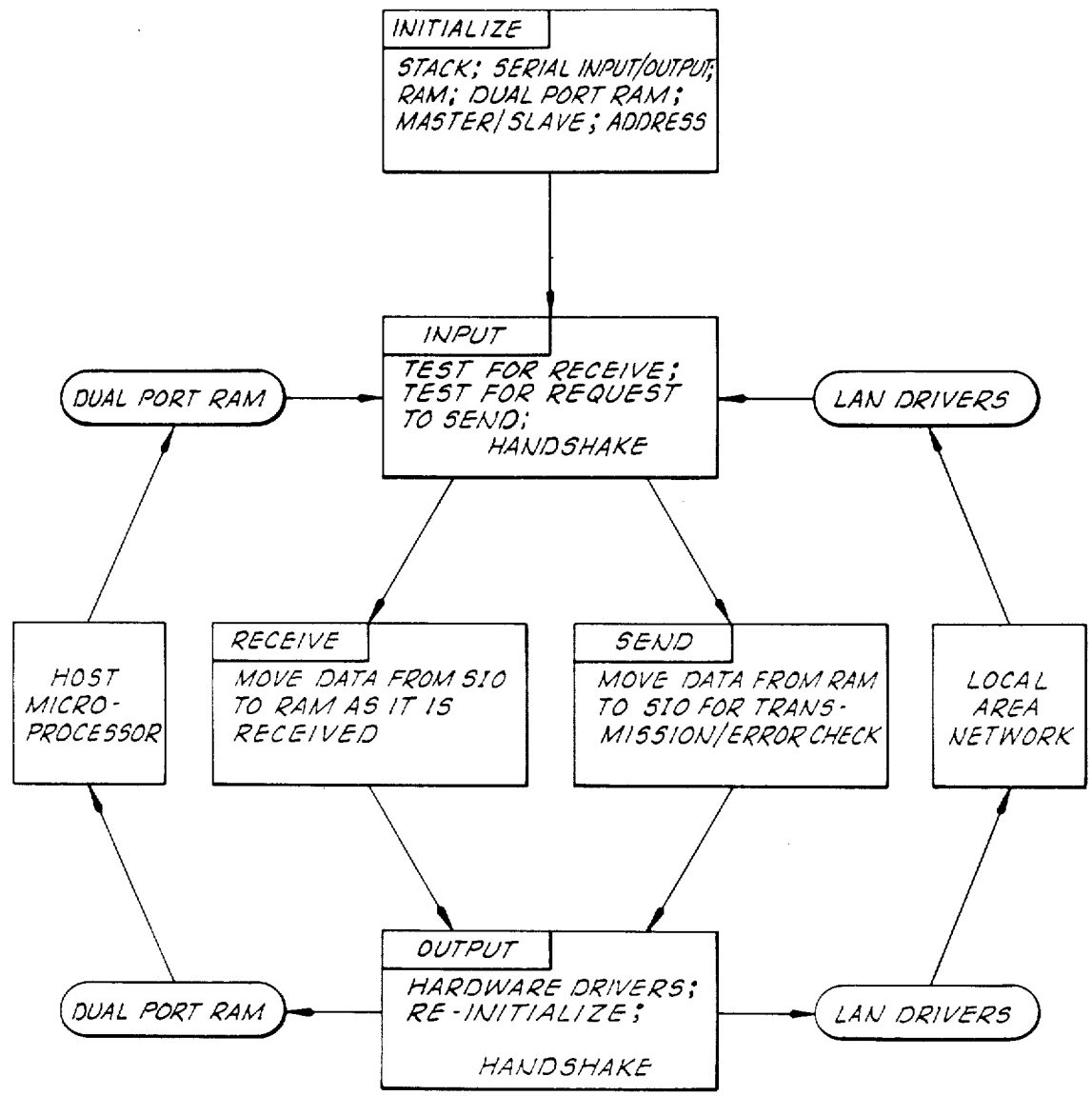
Figure 17:
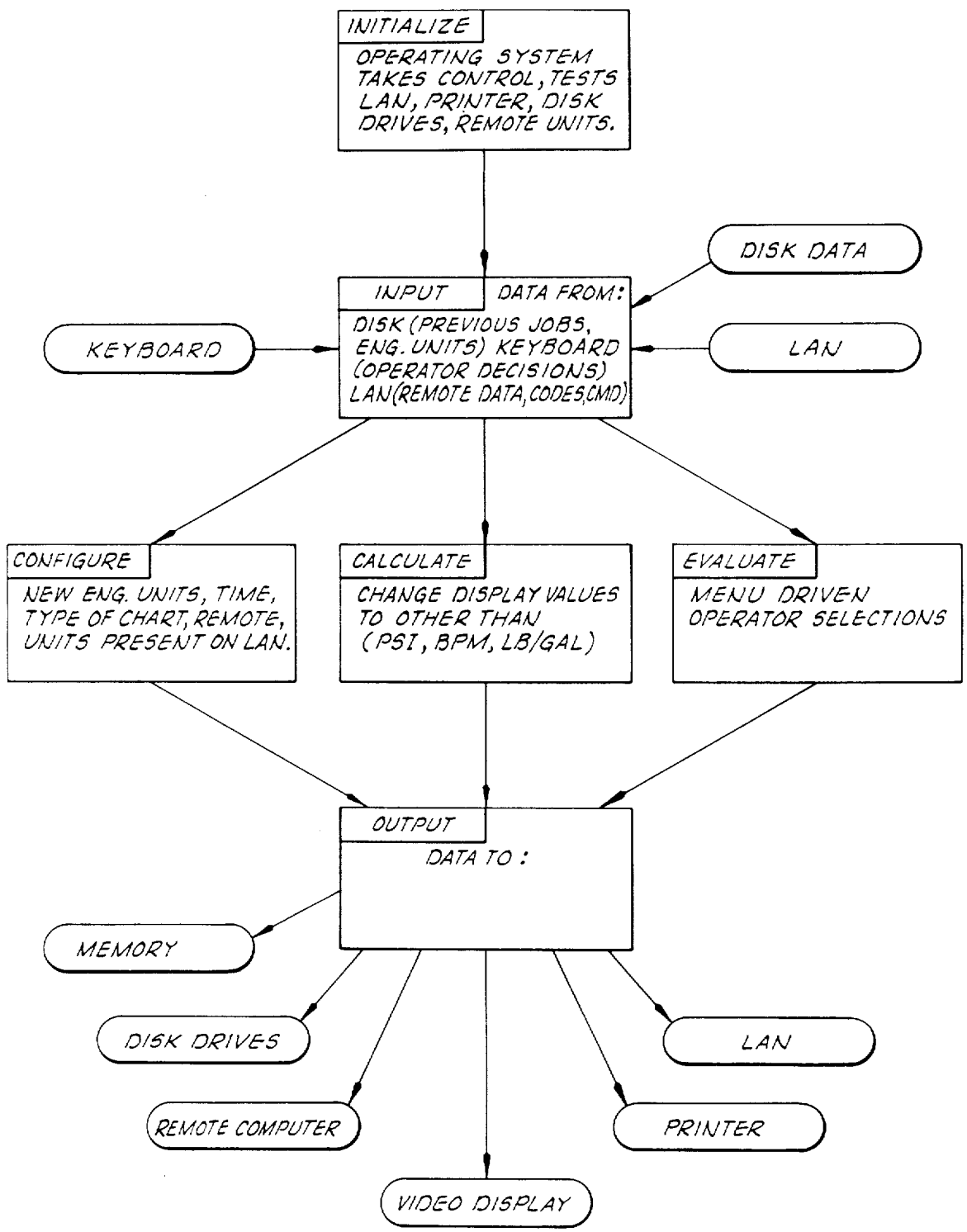
FIG. 17 is a flow chart of a program for controlling a microcomputer in the recorder unit.

The software by which the two microcomputers in each of the data acquisition modules 43 of the display unit 2 and the microcomputer in the recording unit 14 operate can be of any suitable type; however, the preferred embodiment of such software is depicted by the flow charts in FIGS. 15-17 and as is otherwise described throughout the textual specification. The flow chart of FIG. 15 describes the control program for the microprocessor 52; the flow chart of FIG. 16 describes the control program for the microprocessor 70; the flow chart of FIG. 17 describes the control program for the The same header precedes all data transmission. Data length is currently limited to $79_{hex}$ bytes unless a "block transfer" mode is used.

Data from F800 in the RAM 56 is moved to F880 in the RAM 50 with the correct address.

"Command ID" is a code to pass commands between units.

"Data ID" tells how to decode the data block.

Handshaking between the Z80 LAN board 94 and the control microcomputer board 90 is done in memory locations F900 and F980. On initialization the microprocessor 52 writes an $AA_h$ to F900 in the RAM 50. The microprocessor 70 writes an $AA_h$ back to $F980_h$. Then to check for errors, the microprocessor 52 writes $55_h$ to $F900_h$ and the microprocessor 70 echos it back to $F980_h$.

Once the microprocessor 52 sets up the data block at $F800_h$ it increments $F900_h$ and the microprocessor 70 retrieves the data block into its RAM 74 and awaits a command from the recording unit 14. After the transmission to the recorder unit 14 occurs, the microprocessor 70 increments $F980_h$ in the RAM 5 and the microprocessor 50 can look to $F980_h$ for the reply.

In the recording unit 14 the EPROM 138 is used to get the single board computer of 134 started. The actual operating program for the computer 134 is, however, stored on a 3.5" floppy diskette loaded in the floppy disk controller and drive means 40. The actual CP/M3 operating system, which is a known system used in the preferred embodiment of the present invention, takes over when the boot from the EPROM loads the first sector of Track 0 on Disk Drive A. This is CPM.LDR. This loader continues to load the rest of Track 0. This in turn loads a file from the disk called CPM3.SYS which contains the Basic Disk Operating System (BDOS) and the Basic Input Output System (BIOS). The last thing BIOS does is load a file called CCP.COM. The Console Command Processor (CCP) looks for a file on the disk called PROFILE.SUB. It uses SUBMIT.COM to execute the PROFILE.SUB commands, which leads to the major operating program.

Other files used in a specific implementation and known or readily ascertainable to those in the art for performing the indicated functions with the specific hardware identified herein are:

LANMARC.COM—Main data acquisition and storage control
SYSFMT.COM—HALDOS 320K disk format
MDFMTI.COM—HALDOS 720K disk format
INIT.COM—System initialization
CONR.COM—Configure strip chart to determine which characteristics are charted
PLABAK.COM—Strip chart playback
PLABAKI.COM—Tabular chart playback
DLTPB.COM—Data acquisition module dump tabular playback
DOWNLOAD.COM—Read 64K RAM of data acquisition module into recording unit
STRIP.COM—Data acquisition module dump strip chart playback
RPLOT.COM—Real time printer drive (strip chart)

Other files on the disk which are known and can be used by experienced CP/M3 programmers include:

LIB.COM—Create library of compiled REC files.
SID.COM—Assembly language debugger.
GET.COM—Get console input from a disk file.
DATE.COM—Display and set date and time.
GENCOM.COM—Create special CP/M3.
LINK.COM—Link REL files into executable.
TYPE.COM—Display a text file on console.
PUT.COM—Send console output to disk.
HELP.COM—Additional help for new users.
DEVICE.COM—Display/ARter peripheral assignments.
DATESET.COM—MSC-ICO dateset program.
GENCPM.COM—General new CP/M System Tracks
PIP.COM—Peripheral interchange program.
MAC.COM—Assembly language macro assembler.
SETDEF.COM—Define disk search path.
DIR.COM—Display list of file names/size/attribute.
SCR.COM—Show disk characteristics.
ED.COM—Edit a test file.
SHOW.COM—Display ASCII file to computer console.
RMAC.COM—Relocatable assembly language assembly.
DUMP.COM—ASCII/Hex dump of disk file.
COPYSYS.COM—Create a new SYSTEM disk.
ERASE.COM—Erase a file.
SET.COM—Change file attributes.
XREF.COM—Crossreference for MAC, RMAC.
RENAME.COM—Change a file Name.
RESET.COM—Reset MSC-ICO SBC.
SAVE.COM—Save memory to disk.
IDU.COM—MSC-ICO Disk Initialize Program.
HEXCOM.COM—Generate COM file from Hex file.
INITDIR.COM—Set up directory for date/time.
SERIAL.COM—Change baud rates on Serial Ports.
FKEY.COM—Function Key definition program.
FKEY.SYS—Store function key values.

It is contemplated that other software and networking protocols can be used in implementing the data transfer system.

Operation

Overview

In the preferred embodiment the method of the present invention acquires data from a flow process at a well site. This method, which is readily adaptable to other uses, comprises detecting from spatially separated locations of the flow process a plurality of characteristics (e.g., pressure, flow rate and density) occurring within the flow process; converting, at at least one location near the flow process, the detected characteristics into digital electrical signals representing the magnitudes of the detected characteristics; and transferring the digital electrical signals over the single pair of transmission conductors 164 to a single location remote from the flow process. The step of transferring includes, at each of the locations near the flow process, moving, with the respective control microprocessor 52 at that location, the digital electrical signals at that location into the respective digital random access memory 50; moving, with the respective transmission microprocessor 70, the digital electrical signals from the respective digital memory 50 onto the single pair of transmission conductors 164; and receiving, with the microprocessor 136 at the single location remote from the flow process, all the digital electrical signals moved onto the single pair of transmission conductors 164 from each of the one or more locations.

The foregoing "moving" steps are performed within each of the data acquisition modules 43. These moving steps are performed by operating the two microcomputers contained within each respective data acquisition module 43. These operations are performed at respective locations near where the detected characteristics exist. That is, the data acquisition modules 43 (and their combination into display units 2) are used within the environment of the monitored operation, whereas the recording unit 14 is used outside of this environment. These operations of the two microcomputers within each of the data acquisition modules 43 are particularly performed by modifying a digital status word stored in the digital memory 50 linking the two microcomputers when one of the microcomputers transfers the digital electrical signals into the digital memory 50. In response to modifying such a digital status word, the other microcomputer detects this and transfers the digital electrical signal into its own independent random access memory (i.e., either the memory 56 or the memory 74). For example, the microprocessor 52 writes a data word into the random access memory 50 and increments a bit of a status word also contained within the random access memory 50. The microprocessor 70 monitors this status word and, thus, detects when the bit has been incremented. This causes the microprocessor 70 to read the stored data word through a second port of the random access memory 50 into its own random access memory 74. See the "Software" section above.

The method of operation of the overall system including both the display unit 2 and the recording unit 14 further comprises recording the transferred digital electrical signals on a digital storage diskette at the single location which is remote from the operation being monitored.

The system of the present invention can be further operated so that the recording unit 14 is controlled by signals generated in the display unit 2 and transferred through the cable 16. This includes entering, through the microprocessor 52 and from there into the random access memory 50, a control signal generated by depressing appropriate keys on the keyboard 66. This control signal is moved, by the microprocessor 70, from the random access memory 50 onto the single pair of transmission conductors 164 for conducting the monitored data through the cable 16. The microprocessor 136 of the single board computer within the recording unit 14 is then actuated in response to this control signal. Stated differently, digital control data are entered at the location of the data acquisition module 43, the control microcomputer thereof is operated to transfer the digital control data into the shared digital memory, and the transferring microcomputer is operated to transfer the digital control data from the shared digital memory to the monitored data output port of the data acquisition module for transmission over the communication conduit to control another device connected to the communication conduit.

Just as the recording unit 14 can be controlled by signals generated at the display unit 2, the display unit 2 can be controlled by signals generated at the recording unit 14. This is done by reversing the aforementioned operation in that the transfer microcomputer, including the microprocessor 70, obtains data from the communication conduit and stores the control data in the random access memory 50. The microprocessor 70 causes a status word in the memory 50 to be incremented or otherwise changed so that the microprocessor 52 responds to the changed status word to retrieve the digital control data from the memory 50 and to provide a control output signal in response to the digital control data. For example, the microprocessor 52 would cause one of the analog switches 62 to open or close, thereby causing some external function to occur in response to the changed state of the switch. The microprocessor 52 could also cause an analog output signal to be provided through the digital to analog converter means 68 to similarly control an external device. Such external devices could be related to controlling the monitored operation so that the monitored characteristic is thereby changed.

Calibration

Still another operation of the present invention is the ability to enter multiple calibration points into each data acquisition module 43 so that each module responds accurately to an input received through the connector means to which the various transducers are connectible. Such a calibration control means includes means for defining within each apparatus more than two points of the predetermined response characteristic of the transducer detector means so that the data acquisition module is calibrated for nonlinear changes in the predetermined response characteristic. The method by which this is implemented includes: entering calibration factors, such as via the keyboard 66, through the microprocessor 52 into its random access memory 56; receiving a transducer signal from a transducer detecting the monitored characteristic and connected to an appropriate one of the inputs to which the voltage to frequency converter 42 and the amplify and square circuit 44 are connected; and creating the digital electrical signal to be transferred to the recording unit 14 in response to the transducer signal and the calibration factors. This further includes determining whether the response of the transducer is linear.

To determine if the response of the transducer is linear, more than two known values of the monitored characteristic are applied to the transducer which is connected to the module 43. The responses of the transducer to the known values of the characteristic are displayed through one of the displays 100, 102 operated by the microprocessor 52, and the displayed responses are compared to determine if the changes between test values are linear or non-linear. Each of the more than two known values of the characteristic and the corresponding responses thereto are then loaded into the memory 56 when the comparison of the displayed responses indicates the response of the transducer is not linear.

In the preferred embodiment of the present invention, up to fourteen calibration points can be entered. So that the calibration factors, and other stored data, are continuously retained within the data acquisition module 43 even when no external power is being applied thereto, the method of the present invention further comprises continuously energizing the random access memory 56. This is accomplished in the preferred embodiment by a battery 168 and its associated circuitry located on the random access memory board 96 shown in FIGS. 9A-9B. Thus, even when the overall system is deenergized, the battery 168 energizes the random access memory 56 so that the calibration factors are retained until other calibration factors are entered in their place.

The multipoint calibration routine can be simulated by drawing a graph of the transducer output. The number on the X axis is the frequency generated by the transducer, and the number on the Y axis is the pressure value represented by the corresponding frequency. By way of example, assume a 4–20 mA pressure transducer generates 2796 Hz at 0 psi and 13982 Hz at 15000 psi. These frequency points are determined by applying the known pressure to the transducer and reading the display of the data acquisition module. Each reading is made by applying the pressure to the transducer, then pressing the following sequence of buttons on the module's keyboard 66:

| PROG | 0 | Chan 1 | OR | Chan 2 | 6 | 4 | 8 | 9 | RUN H | where 64 is the function code and 86 is the access code for the preferred embodiment.

Once the points have been determined, the apparatus is recalibrated by pressing:

| PROG | 0 | Chan 1 | OR | Chan 2 | 6 | 5 | 8 | 6 | RUN H |

(Enter Freq 1) | 0 | 0 | Chan 2 | 7 | 9 | 6 | RUN H |

(Enter Value 1) | 0 | 0 | 0 | 0 | 0 | 0 | RUN H |

(Enter Freq 2) [0][Chan 1][3][9][8][Chan 2][RUN H]

(Enter Value 2) [0][Chan 1][5][0][0][0][RUN H]

(Enter Finish Code) [9][9][9][9][9][9][9][RUN H]

(Enter Finish Code) [9][9][9][9][9][9][9][RUN H].

To calibrate for a flow rate the function code is 65 and the access code is 86. In addition to entering frequencies and corresponding values, a meter factor and a barrel conversion factor are entered. For example, press:

[PROG][0][1][6][5][8][6][RUN H]

(Enter Freq 1) [0][0][0][0][0][0][RUN H]

(Enter Value 1) [0][0][0][0][0][0][RUN H]

(Enter Meter Factor) [0][0][5][5][TEST P][7][RUN H]

(Enter Bbl Conversion) [Chan 1][TEST P][Chan 2][8][4][6][RUN H]

(Enter Finish Code) [9][9][9][9][9][9][9][RUN H]

(Enter Finish Code) [9][9][9][9][9][9][9][RUN H]

The apparatus is now calibrated for a flowmeter for meter factor of 55.7.

In the preferred embodiment calibrations must be in psi, barrels/minute, and lbs/gal to use the recorder unit correctly. If units other than these are to be displayed, scale and offset factors described below can be used. A decimal point is entered using the

[TEST P]

key.

The calibration of a data acquisition module 43 for use as a density monitor is different from calibrations for pressure and flow rate. About eight data points should be used for densometer and rate calibration:

(Enter Freq 1)

[0][3][0][0][0][0]

(Enter Density 1)
(decimal point assumed between second and third digits)

[0][0][0][0]

(Enter Freq 8)

[0][Chan 1][8][Chan 2][0][0]

(Enter Density 8)

[0][8][3][3] (i.e., 8.33 lb/gal)

(Enter Finish Code)

[0][0][0][0][0][0]

(Enter Finish Code)

[0][0][0][0]

Besides multipoint calibration, the data acquisition module has other codes which can be used to change calibration:

1 sec freq. from densometer

[Chan 2][0][6][7][7][Chan 1][RUN H], 10 sec freq from densometer

[Chan 2][Chan 1][6][7][7][Chan 1][RUN H], 100 sec freq. from densometer

[Chan 2][Chan 2][6][7][7][Chan 1][RUN H],

Minimum Digital Analog Converter (DAC) Voltage

[Chan 2][3][6][7][7][Chan 1][RUN H],

Maximum DAC Voltage

[Chan 2][4][6][7][7][Chan 1][RUN H], 500 sec freq average

[Chan 2][5][6][7][7][Chan 1][RUN H],

Display calibration points

[3][6][6][7][7][Chan 1][RUN H],

New LO CAL data

[ 3 ] [ 7 ] [ 6 ] [ 7 ] [ 7 ] [Chan 1] [RUN H] ,

Engineering units can be changed for display purposes. The preferred embodiment of the system uses English units for communication and storage on diskette (i.e., psi, bpm, lb/gal, °F., pH). If it is desired to display in some other units then SCALE and OFFSET routines can be used. It does not matter which one is entered first. Offset should be zero for everything except temperature.

To change displayed scale, press:

[PROG] [ 0 ] [Chan 1] or

[Chan 2] [ 9 ] [ 0 ] [ 8 ] [ 6 ] [RUN H]

The current scale for Channel 1 or Channel 2 is now displayed; if it is correct, press

[RUN H] , otherwise enter a new six-digit scale and press

[RUN H] .

For example, to change to Megapascals (MPa) enter

[TEST P] [ 0 ] [ 0 ] [ 6 ] [ 8 ] [ 9 ] [RUN H]

where P is the decimal point (0.00689 × psi = MPa). To change to liters min, enter

[Chan 1] [ 5 ] [ 8 ] [TEST P] [ 9 ] [ 7 ] [RUN H] .

Codes for engineering units are:

| From | To | Multiply by |
|---|---|---|
| PSI | MPa | .00689 |
| PSI | Bar | .06804 |
| BPM | Gal | 42 |
| BPM | Liters/Min | 158.97 |
| BPM | M³/Min | .15877 |
| LB/GAL | KG/M³ | 119.94 |
| LB/GAL | Spec Gravity | .11984 |
| °F. | °C. | .55556 |

In some cases, an offset is also required as in the conversion from °F. to °C. (°C. = 0.55556 *°F. 17.778). Current software only allows for negative offsets, therefore, for the temperature conversion example, press:

[PROG] [ 0 ] [Chan 1]

OR

[Chan 2] [ 9 ] [Chan 1] [ 8 ] [ 6 ] [RUN H]

[Chan 1] [ 7 ] [TEST P] [ 7 ] [ 7 ] [ 8 ] [RUN H]

The units are configured so that a pressure data acquisition unit accepts two 4–20 mA units. A rate/total data acquisition unit accepts two frequency inputs which it combines and displays as a combined rate on Channel 1 and a combined total on Channel 2. To check a unit type, press

[PROG] [ 0 ] [Chan 1] OR

[Chan 2] [ 7 ] [ 0 ] [ 8 ] [ 6 ] [RUN H] .

A number will be displayed in the far left digit of the

| Channel display: | 04 = Pressure | 05 = Combined Rate |
|---|---|---|
| | 06 = Combined Total | 08 = Single Rate |
| | 09 = Single Total | 10 = U-Tube Densometer |

If the channel is to be changed to another type, press a two-digit number 04, 05, 06, 08, 09, 10 corresponding to the codes above and

[RUN H] .

If the type is okay, just press

[RUN H] .

The modules 43 are initially configured so that the pressure unit address = 1, rate/total unit address = 2 and density unit address = 3.

To change this address, press

[PROG] [ 0 ] [ 0 ] [ 7 ] [Chan 1] [ 8 ] [ 6 ] [RUN H]

The current address will be displayed. To change to another address, press a two-digit number less than 32. No two units may have the same address. Then press To use a data acquistion unit to measure sand concentratration, base fluid density and proppant coefficients must be entered. First, press

to enter sand concentration. If the base fluid is in the densometer now and is displaying the correct value, press

to use this number for base fluid density. If the base fluid density is known, it can be entered directly by pressing

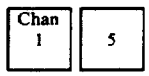

and four more digits xxxx where they represent the base fluid density to two decimal places. For example, if the base fluid is 8.75 lb/gal, press

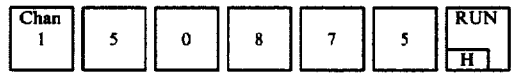

Make sure to press

to complete any operation. Next, enter the correct proppant coefficient. Press

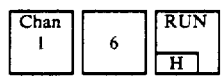

to use sand (0.456) as the proppant. Press

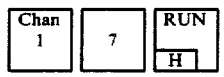

to use SUPER PROP® proppant (0.322). For any other coefficient press

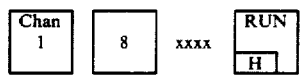

where the x's represent the coefficient to 4 decimal places (e.g., if your proppant coefficient is 0.1500, press

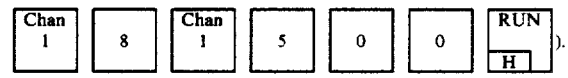).

For setting the internal clock, first check to see if the time is correct by pressing

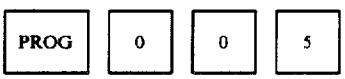

The module then displays

HH:MM:SS
        YY:MM:DD

To change:

a.
Year –
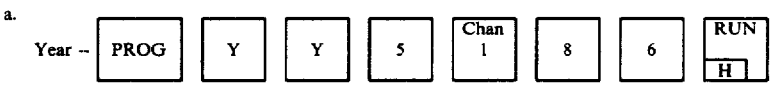

Where YY are the last two digits of the year.

b.
Month –
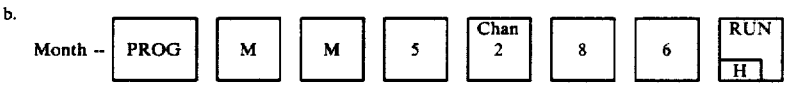

Where MM are the two digits of the month.

c.
Day –
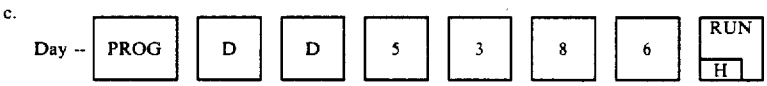

Where DD are the two digits of the day.

d.

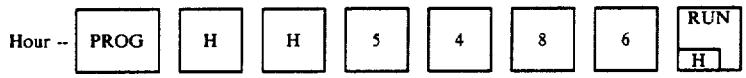

Where HH are the two digits of the hour (24-hour clock).

e.

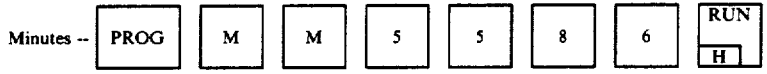

Where MM are the two digits of the minutes.

f.

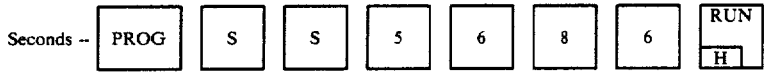

Where SS are the two digits of the seconds counter.

The following error codes are used in the data acquisition module:

| CODE | DESCRIPTION |
| --- | --- |
| H A L P 1 | Divide by zero |
| H A L P 2 | Heap Overflow |
| H A L P 3 | String Overflow Check |
| H A L P 4 | Array and Subrange Check |
| H A L P 5 | Floating Point Overflow |
| H A L P 6 | Floating Point Overflow |

When any PASCAL error is found, one of these codes is displayed. Press

for a COLD START of a data acquistion module. If an H appears as the most significant digit in a channel, then an overrange hs occurred on the display. Either reduce the input or recalibrate. An L is displayed in the lower left corner of Channel 2, if any unrecognizable codes are entered.

The foregoing and other command, or function codes of the preferred embodiment include:

| 50 | Display Time | 64 | Measure Input Frequency |
| --- | --- | --- | --- |
| 51 | Set Year | 65 | Multipoint Calibration |
| 52 | Set Month | 70 | Channel Type |
| 53 | Set Day | 71 | Box Address |
| 54 | Set Hour | 90 | Scale Factor |
| 55 | Set Minute | 91 | Offset Factor |
| 56 | Set Seconds | 99 | Cold Start |
| 00 | Density Mode | 22 | 100 Sec Frequency |
| 04 | AUTOCAL Air | 23 | DAC Minimum |
| 05 | AUTOCAL Water | 24 | DAC Maximum |
| 06 | AUTOCAL Lo Cal | 25 | 500 Sec Frequency avg |
| 07 | AUTOCAL KCL | 36 | Display Calibration Points |
| 10 | And Concentrate | 37 | New Lo Cal Data |
| 14 | Base Fluid | | |
| 15 | New Base Fluid | | |
| 16 | Sand | | |
| 17 | SUPER PROP ® | | |
| 18 | New Proppant | | |
| 20 | 1 Sec Frequency | | |
| 21 | 10 Sec Frequency | | |

(NOTE: Codes greater than 18 require 6771 access number after code. Then RUN)

Operating the Display Unit 2

After turning the power switch "ON" (see switch 170 in FIG. 4), the three data acquisition modules 43 will automatically start running using information previously saved in the respective battery backed-up random access memories 56 during the calibration procedures. If any of the modules has flashing 8's in a display 100, 102, the RAM 56 is not working correctly and needs to be calibrated.

The operator can perform five major functions on a data acquisition module:

Zero a pressure channel;
Zero a total volume channel;
Enter setpoints to control analog switches;
Press test button; and
Enter event codes.

A. Zero a pressure channel (NOTE: Pressure transducers must be connected to the display unit)

This is done when a new transducer is used or if minor pressure changes have occurred. Press ZERO then select the desired channel,

with zero pressure on the transducer. Any pressure offset on the channel selected (1 or 2) will be zeroed.

B. Zero a total volume channel

To zero the total volume counter, press

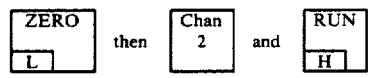

for total volume display.

C. Enter setpoints for pressure or rate to control analog switches.

Setpoints can be used to control pumping functions. When an analog switch closes it can be used to trigger an alarm horn or even shift a transmission to neutral. When the displayed value in a channel exceeds the setpoint stored in memory for that channel, the relay closes. By pressing

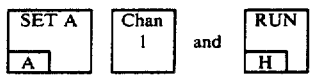

the current setpoint for switch 1 is displayed (e.g., if the setpoint is 10,000 psi you will see "1000P" where P represents the decimal point.) If the setpoint needs to be changed, press five zeros, then the new number then

otherwise just press

To control switch 2, press

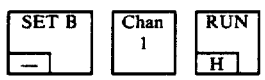

(change the number the same way as for switch 1).

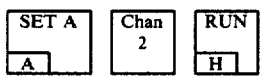

controls switch 3.

D. Press test button. Pressing

performs a routine test of the module's memory and displays. First an EPROM sumcheck will be performed. If the EPROM is okay, the number 24737 will be displayed on Channel 1. Then a RAM check will be done with the result displayed as a flashing number on Channel 2 (the number displayed at the end of a RAM check should be 63036). If the number is less than 63036, the RAM 56 is no longer 100% functional and the unit should be used only with caution. (NOTE: The RAM 56 is used to store calibration and job data. If it is not completely functional, this could result in loss of job data). If this test passes, a series of walking 8's will move across the displays and the test will be complete. The walking 8's check the segments of all display digits.

E. Enter event codes: Event codes are used as landmarks in the sequence of monitored events. As measurements are being recorded, the event codes can be entered as they occur during the job.

The following codes are available.

| CODE | EVENT | CODE | EVENT |
|---|---|---|---|
| 41 | JOB START | 57 | BOTTOM PLUG DROPPED |
| 42 | JOB PAUSE | 59 | DISPLACEMENT |
| 43 | PRESSURE TEST | 61 | PLUG LANDED |
| 45 | CIRCULATE | 63 | USER 1 |
| 47 | LEAD CEMENT | 65 | USER 2 |
| 49 | SPACER 1 | 67 | USER 3 |
| 51 | TAIL CEMENT | 68 | JOB RESUME |
| 53 | SPACER 2 | 69 | JOB END |
| 55 | TOP PLUG DROPPED | | |

NOTE: Codes 63, 65, 67 can be used for any special event as needed. Code 69 will stop the recording system and print a job summary. Code 42 will stop the recording process. Code 68 will restart the recording after a job pause from code 42.

To enter an event code, press

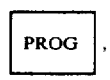

then the two-digit code, and

The current version of the data acquisition module adapted for monitoring density operates a little differently than the pressure and rate data acquisition units. To be sure the density unit is calibrated properly before running a job, one of the following auto calibration programs can be run (the densometer must have the correct fluids in it and be connected to the data acquisition module):

AUTOCAL with air in densometer - Press

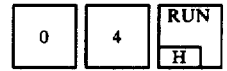

AUTOCAL with water in densometer - Press

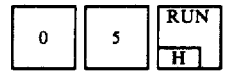

AUTOCAL with air in densometer and LO CAL knob pulled out and turned CCW - Press 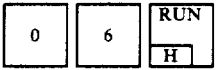

AUTOCAL with 2% KCL (8.44 lb/gal) in densometer - Press

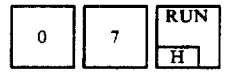

After the

button is pressed the densometer will take samples of the fluid for 200 seconds and will then return to normal operation with new calibration data.

Operating the Recording Unit 14

Turn "ON" the power switch (switch 172, FIG. 12) for the recording unit 14. Insert a diskette into disk drive A and a data disk into disk drive C. To playback information recorded on previous jobs, insert the applicable job data disk into disk drive C.

To perform a function with the recording unit 14, one of the following menu items is selected:

| MAIN MENU |
|---|
| 1 - Start Job   2 - Setup Strip Chart   3 - Tabular Playback |
| 4 - Format Disk   5 - Print Title Page   6 - Return to DOS |
| 7 - Help   8 - Data Acquisition Unit   9 - Playback Strip Chart |
| 10 - Data Acquisition Playback |

If you want to:
A. Start Job—Press 1 and

[RETURN].

The recording system waits for job start (code 41). It will now start recording data and printing a strip chart of the selected channels. After pressing the "1" and the "RETURN" buttons, the printer will type "YOU HAVE SELECTED 1-START JOB ARE YOU SURE (Y/N)", type YES if this is the correct function. The only way to get back to the Main Menu is to press 69 which is the event code for job end. Any of the other event codes may also be entered from the keyboard 150 while a job is being recorded. All other keys are ignored.

B. Setup Strip Chart—Press 2 and

[RETURN].

The strip chart can be calibrated by defining which of the monitored channels should be displayed on the three chart spaces available as the output of the printer 152.

C. Tabular Playback—Press 3 and

[RETURN].

This displays data previously recorded on a job disk.

The computer asks the nature of the data to be printed: 1. 1 sec data 2. 10 sec data 3. 30 sec data 4. 1 min data 5. 10 min data Select the number (1, 2, 3, 4 or 5) of the desired time interval, then press

[RETURN].

Then select the four channels to be displayed in tabular form.

Next, select the engineering units to be displayed.

At this point the program will automatically start printing a tabular chart.

D. Format Disk—Press 4 and

[RETURN].

This will cause the disk in drive C to be formatted.

E. Print Title Page—Press 5 and

[RETURN].

The printer will generate a title page. After it is done, it will wait for the job start code. Press 1 and

[RETURN].

F. Return to DOS—Press 6 and

[RETURN].

This enables the recording unit 14 to be used as a computer if a CP/M development system disk has been inserted in drive A. This allows the programs listed above to be run.

G. Help—Press 7 and

[RETURN].

This displays basic operating instructions directly from the disk.

H. Data Acquisition Unit Dump—PRESS 8 and

[RETURN].

This gets data stored in the RAM 56 in case it could not be stored on disk during a job. A set of data points is stored in the data acquisition module every 10 seconds which tells the high, low and 10 second average of each channel value and total.

I. Playback Strip Chart—Press 9. The recording unit 14 will generate a stripchart identical to the real-time one made during the job unless the stored values are changed through operator control.

J. Data Acquisition Playback—Press 10—This plays back the data acquired from the Data Acquisition Unit Dump in tabular or strip chart modes.

Conclusion

The foregoing describes a preferred embodiment of the present invention as presently developed; however, modifications have been contemplated. With respect to the display unit 2, it has been contemplated that an intrinsically safe display unit be developed to operate in hazardous environments. It has also been contemplated to implement a nitrogen flow analyzer system using one of the data acquisition modules, and to add self-test programs to the data acquisition module to simplify troubleshooting. With respect to the recording unit 14, a playback program could be modified to add strip charts which can be displayed using the whole width of the paper for one value (in the current embodiment, the chart is divided into three sections to make identification of different value lines easier) and to add plotting of all three values using the full width of the paper for better chart resolution. Self-test programs could be added to simplify troubleshooting; more detailed assistance instructions could be incorporated within the program; and the capability to enter customer data from the keyboard could be added.

In summary, the computerized system of the present invention, specifically adapted for recording cementing data at an oil or gas well site, gathers signals from up to 32 sensors through interconnected display units and stores the information on a single miniature diskette located remotely from the site of the operation. The present invention simultaneously makes a chart of this data using a standard computer printer to generate a chart similar to ones produced by an analog pen recorder. This enables print times, dates, actual data value and other specific alphanumeric information to be printed along with the graphical representation. The use of this system will improve quality control of the monitored process and provide data needed for analysis of problems which occur within the operation.

Particularly unique within the system is the implementation of a local area network design which in the preferred embodiment uses a portion of the SDLC industry standard to reliably move data from one location to another. This permits a number of ruggedized displays to be placed close to their transducers while allowing the more sensitive printer and diskette drive to be placed at a relatively far distance from the monitored operation environment. The flexibility of the local area network configuration allows, in the preferred embodiment, up to 32 display units to be connected to a network gathering data from units as far away as 2,000 feet. Another unique feature is the design of the data acquisition module which can be independently used as data monitoring and system control devices which can be both locally and remotely operated.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and the performance of steps can be made by those skilled in the art, which changes are encompassed within the spirit of this invention as defined by the appended claims.

What is claimed is:

1. A data transfer system for transferring, across an area of a well site, data related to the control of an oil or gas well operation with which a plurality of different detectable characteristics are associated, comprising:
- interface means, located near the detectable characteristics, for communicating with the operation, said interface means including:
  - means for converting signals representing the plurality of different detectable characteristics into digitally encoded data; and
  - means, connected to said means for converting, for transmitting the digitally encoded data;
- central processing means, located across an area of the well site remotely from the detectable characteristics and said interface means, for receiving the digitally encoded data; and
- local area network means for connecting said interface means and said central processing means so that the digitally encoded data is received by said central processing means from said interface means only through a single information transfer conduit extending across an area of the well site, said local area network means including one and only one data transmission cable which defines said single information transfer conduit and which is connected between said interface means and said central processing means, said data transmission cable including a single pair of electrically conductive wires, connected between said means for transmitting and said central processing means, over which all transmitted digitally encoded data derived from the plurality of detectable characteristics is transferred.

2. A system as defined in claim 1, wherein said one and only one data transmission cable further includes one and only one other single pair of electrically conductive wires, connected between said means for transmitting and said central processing means, over which timing signals are transferred.

3. A data transfer system for transferring data related to the control of an oil or gas well operation with which a first plurality of different detectable characteristics and a second plurality of different detectable characteristics are associated, comprising:
- first interface means for communicating with the operation, including for communicating with the first plurality of different detectable characteristics;
- second interface means for communicating with the operation including for communicating with the second plurality of different detectable characteristics;
- central processing means for receiving information from, and for sending information to, said first interface means and said second interface means;
- local area network means, connected between said first interface means and said central processing means, for connecting said first interface means and said central processing means so that the information received from, and the information sent to, said first interface means and said second interface means is transferred between said first interface means and said central processing means only through a single information transfer conduit, said single information transfer conduit having a predetermined length sufficient to allow said central processing means to be located beyond the immediate environment of the oil or gas well operation when said first interface means is located within such immediate environment so that the ability of said central processing means to operate is not adversely affected by the oil or gas well operation; and
- a branch information transfer conduit connected between said first interface means and said second interface means in communication with said single information transfer conduit, said branch information transfer conudit having a length substantially shorter than the length of said single information transfer conduit so that said second interface means remains within substantially the same environment as said first interface means.

4. A data transfer system for transferring data related to an operation, comprising:
- a display unit, adapted for being located near the operation where a plurality of detectable characteristics of the operation are to be monitored, said display unit including:
  - a portable housing;
  - first data acquisition means, mounted in said portable housing, for encoding a first one of the detectable characteristics into a first encoded signal and for transmitting said first encoded signal;
  - second data acquisition means, mounted in said portable housing, for encoding a second one of the detectable characteristics into a second encoded signal and for transmitting said second encoded signal; and third data acquistion means, mounted in said portable housing, for encoding a third one of the detectable characteristics into a third encoded signal and for transmitting said third encoded signal;

recording means, adapted for being located at a distance from said display unit, for receiving and recording said first, second and third encoded signals; and a single pair of electrical conductor having one end of the pair connected through said portable housing to said first, second and third data acquistion means and having the other end of the pair connected to said recording means, over which said single pair of conductors all said first, second and third encoded signals are transferred from said display unit to said recording means.

5. A system as defined in claim 4, wherein said recording means includes:

a second portable housing;

a floppy disk drive mounted in said second portable housing;

a printer mounted in said second portable housing;

a keyboard mounted in said second portable housing; and a single board computer means, mounted in said second portable housing and connected to said single pair of electrical conductors and responsive to entries made through said keyboard, for receiving said first, second and third encoded signals over said single pair of electrical conductors and for recording said first, second and third encoded signals on floppy disks mounted in said floppy disk drive and for generating a visual output through said printer in response to said first, second and third encoded signals.

6. A system as defined in claim 4, wherein each of said first data acquisition means, said second data acquisition means and said third data acquisition means includes:

a dual port random access memory;

first microcomputer means for processing the respective encoded signal and for storing the respective encoded signal in said random access memory through one port thereof; and second microcomputer means for obtaining the respective encoded signal from said random access memory through the other port thereof and for transferring the obtained encoded signal to said recording means over said single pair of electrical conductors.

7. A method of acquiring data from a flow process at a well site, comprising:

detecting at the flow process a plurality of characteristics occurring within the flow process;

converting at the flow process the detected characteristics into encoded signals representing the detected characteristics; and transmitting the encoded signals to an end of a single pair of transmission conductors located at the flow process and transferring the encoded signals through the single pair of transmission conductors to the other end of the transmission conductors located at a location remote from the flow process.

8. A method as defined in claim 7, further comprising recording the transferred encoded signals on a digital storage diskette connected at said other end of the transmission conductors.

9. A method as defined in claim 7, wherein transmitting and transferring the encoded signals includes:

moving, with a first microprocessor, the encoded signals into a digital memory;

moving, with a second microporcessor, the encoded signals from the digital memory onto the single pair of transmission conductors; and receiving with a microprocessor at the location remote from the flow process, all the encoded signals moved onto the single pair of transmission conductors.

10. A method as defined in claim 9, further comprising:

entering, through the first microprocessor and into the digital memory, control signal;

moving, with the second microprocessor, the control signal from the digital memory onto the single pair of transmission conductors; and actuating the microporcessor at the location remote from the flow process with the control signal.

11. A method as defined in claim 7, wherein:

the step of detecting includes:

locating a first data acquistion unit at the process, said first data acquisition unit including a first microcomputer, a second microcomputer, a first memory having a first port connected to said first microcomputer and having a second port connected to said second microcomputer, and a first serial output means connected to said second microcomputer and to said end of said single pair of transmission conductors for outputting encoded signals onto said single pair of transmission conductors;

locating a second data acquisition unit at the process, said second dta acquisition unit including a third microcomputer, a fourth microcomputer, a second memory having a first port connected to said third microcomputer and having a second port connected to said fourth microcomputer, and a second serial output means connected to said fourth microcomputer and to said end of said single pair of transmission conductors for outputting encoded signals onto said single pair of transmission conductors;

connecting a first transducer to said first microcomputer;

connecting a second transducer to said third microcomputer;

receiving at said first microcomputer first transducer signals from said first transducer; and receiving at said third microcomputer second transducer signals from said second transducer;

the step of converting includes:

processing said first trnasducer signals through said first microcomputer to provide encoded first transducer signals as a part of said encoded sigals; and processing said second transducer signals through said second microcomputer to provide encoded second transducer signals as a part of said encoded signals; and the step of transmitting includes:

processing said encoded first transducer signals through said first memory, said second microcomputer and said first serial output means so that said encoded first transducer sigals are communicated to said other end of said single pair of transmission conductors; and processing said encoded second transducer signals through said second memory, said fourth microcomputer and said second serial output means so that said encoded second transducer signals are communicated to said other end of said single pair of transmission conductors.

* * * * *

UNITED STATES PATENT AND TRADEMARK OFFICE
CERTIFICATE OF CORRECTION

PATENT NO. : 4,751,648

DATED : June 14, 1988

INVENTOR(S) : Leslie Ray Sears, III et al

It is certified that error appears in the above-identified patent and that said Letters Patent is hereby corrected as shown below:

In claim 4, column 32, line 68 delete "en-"

In claim 4, column 35, line 1 delete "municated to said other end of said single pair of transmission conductors; and
processing said encoded second transducer signals through said second memory, said fourth microcomputer and said second serial output means so that said encoded second transducer signals are communicated to said other end of said single pair of transmission conductors."

In claim 4, column 32, line 68, after second insert --encoded signal and for transmitting said second encoded signal; and
third data acquisition means, mounted in said portable housing, for encoding a third one of the detectable characteristics into a third encoded signal and for transmitting said third encoded signal;
recording means, adapted for being located at a distance from said display unit, for receiving and recording said first, second and third encoded signals; and
a single pair of electrical conductors having one end of the pair connected through said portable housing to said first, second and third data acquisition means and having the other end of the pair connected to said recording means, over which said single pair of conductors all said first, second and third encoded signals are transferred from said display unit to said recording means.- -

Please add the following claims:

5. A system as defined in claim 4, wherein said recording means includes:
   a second portable housing;
   a floppy disk drive mounted in said second portable housing;
   a printer mounted in said second portable housing;
   a keyboard mounted in said second portable housing; and

UNITED STATES PATENT AND TRADEMARK OFFICE
CERTIFICATE OF CORRECTION

PATENT NO. : 4,751,648

DATED : June 14, 1988

INVENTOR(S) : Leslie Ray Sears III et al

It is certified that error appears in the above-identified patent and that said Letters Patent is hereby corrected as shown below:

a single board computer means, mounted in said second portable housing and connected to said single pair of electrical conductors and responsive to entries made through said keyboard, for receiving said first, second and third encoded signals over said single pair of electrical conductors and for recording said first, second and third encoded signals on floppy disks mounted in said floppy disk drive and for generating a visual output through said printer in response to said first, second and third encoded signals.

6. A system as defined in claim 4, wherein each of said first data acquisition means, said second data acquisition means and said third data acquisition means includes:

a dual port random access memory;

first microcomputer means for processing the respective encoded signal and for storing the respective encoded signal in said random access memory through one port thereof; and second microcomputer means for obtaining the respective encoded signal from said random access memory through the other port thereof and for transferring the obtained encoded signal to said recording means over said single pair of electrical conductors.

7. A method of acquiring data from a flow process at a well site, comprising:

detecting at the flow process a plurality of characteristics occurring within the flow process;

converting at the flow process the detected characteristics into encoded signals representing the detected characteristics; and transmitting the encoded signals to an end of a single pair of transmission conductors located at the flow process and

UNITED STATES PATENT AND TRADEMARK OFFICE
CERTIFICATE OF CORRECTION

PATENT NO. : 4,751,648

DATED : June 14, 1988

INVENTOR(S) : Leslie Ray Sears III et al

It is certified that error appears in the above-identified patent and that said Letters Patent is hereby corrected as shown below:

transferring the encoded signals through the single pair of transmission conductors to the other end of the transmission conductors located at a location remote from the flow process.

11. A method as defined in claim 7, wherein:
    the step of detecting includes:
      locating a first data acquisition unit at the process, said first data acquisition unit including a first microcomputer, a second microcomputer, a first memory having a first port connected to said first microcomputer and having a second port connected to said second microcomputer, and a first serial output means connected to said second microcomputer and to said end of said single pair of transmission conductors for outputting encoded signals onto said single pair of transmission conductors;
      locating a second data acquisition unit at the process, said second data acquisition unit including a third microcomputer, a fourth microcomputer, a second memory having a first port connected to said third microcomputer and having a second port connected to said fourth microcomputer, and a second serial output means connected to said fourth microcomputer and to said end of said single pair of transmission conductors for outputting encoded signals onto said single pair of transmission conductors;
    connecting a first transducer to said first microcomputer;
    connecting a second transducer to said third microcomputer;
    receiving at said first microcomputer first transducer signals from said first transducer; and
    receiving at said third microcomputer second transducer signals from said second transducer;

UNITED STATES PATENT AND TRADEMARK OFFICE
CERTIFICATE OF CORRECTION

PATENT NO. : 4,751,648

DATED : June 14, 1988

INVENTOR(S) : Leslie Ray Sears III et al

It is certified that error appears in the above-identified patent and that said Letters Patent is hereby corrected as shown below:

the step of converting includes:
        processing said first transducer signals through said first microcomputer to provide encoded first transducer signals as a part of said encoded signals; and
        processing said second transducer signals through said second microcomputer to provide encoded second transducer signals as a part of said encoded signals; and
    the step of transmitting includes:
        processing said encoded first transducer signals through said first memory, said second microcomputer and said first serial output means so that said encoded first transducer signals are communicated to said other end of said single pair of transmission conductors; and
        processing said encoded second transducer signals through said second memory, said fourth microcomputer and said second serial output means so that said encoded second transducer signals are communicated to said other end of said single pair of transmission conductors.

8. A method as defined in claim 7, further comprising recording the transferred encoded signals on a digital storage diskette connected at said other end of the transmission conductors.

9. A method as defined in claim 7, wherein transmitting and transferring the encoded signals includes:
    moving, with a first microprocessor, the encoded signals into a digital memory;
    moving, with a second microprocessor, the encoded signals from the digital memory onto the single pair of transmission conductors; and

UNITED STATES PATENT AND TRADEMARK OFFICE
CERTIFICATE OF CORRECTION

PATENT NO. : 4,751,648

DATED : June 14, 1988

INVENTOR(S) : Leslie Ray Sears III et al

It is certified that error appears in the above-identified patent and that said Letters Patent is hereby corrected as shown below:

receiving, with a microprocessor at the location remote from the flow process, all the encoded signals moved onto the single pair of transmission conductors.

10. A method as defined in claim 9, further comprising:

entering, through the first microprocessor and into the digital memory, a control signal;

moving, with the second microprocessor, the control signal from the digital memory onto the single pair of transmission conductors; and actuating the microprocessor at the location remote from the flow process with the control signal.

Signed and Sealed this

Fifteenth Day of November, 1988

Attest:

DONALD J. QUIGG

*Attesting Officer*  *Commissioner of Patents and Trademarks*